(12) United States Patent
Smith et al.

(10) Patent No.: US 9,710,670 B2
(45) Date of Patent: Jul. 18, 2017

(54) PUBLICATION AND REMOVAL OF ATTRIBUTES IN A MULTI-USER COMPUTING SYSTEM

(71) Applicant: INTEL CORPORATION, Santa Clara, CA (US)

(72) Inventors: Ned M. Smith, Beaverton, OR (US); Nathan Heldt-Sheller, Portland, OR (US); Thomas G. Willis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/035,559

(22) Filed: Sep. 24, 2013

(65) Prior Publication Data

US 2014/0181995 A1    Jun. 26, 2014

Related U.S. Application Data

(63) Continuation-in-part of application No. 13/997,918, filed as application No. PCT/US2012/071029 on Dec. 20, 2012.

(51) Int. Cl.
G06Q 30/00 (2012.01)
G06F 21/10 (2013.01)
G06F 21/62 (2013.01)

(52) U.S. Cl.
CPC .................. *G06F 21/6254* (2013.01)

(58) Field of Classification Search
CPC ............ G06Q 30/02; G06F 7/04; G06F 17/30
(Continued)

(56) References Cited

U.S. PATENT DOCUMENTS 7,194,424 B2   3/2007  Greer et al.
7,689,672 B2   3/2010  Kanojia et al.
(Continued)

FOREIGN PATENT DOCUMENTS

CN      1848742 A    10/2006
CN    102193794 A     9/2011
(Continued)

OTHER PUBLICATIONS

"Mash Maker—A Paradigm Shift in Web Browsing", 23 pages.
(Continued)

*Primary Examiner* — Sun Li
(74) *Attorney, Agent, or Firm* — Schwabe, Williamson & Wyatt, P.C.

(57) ABSTRACT

Embodiments of the present disclosure are directed toward publication and/or removal of attributes in a multi-user computing environment. In some embodiments, a consumer information manager (CIM) associated with a user of a multi-user computing system may receive a notification, from a dimension authority (DA), of a decrease in a population count of users of the computing system who have published an attribute within the computing system, and may determine whether the user has published the attribute. In response to receiving the notification of the decrease and determining that the user has published the attribute, the CIM may determine a likelihood that continued publication of the attribute will enable identification of the user, compare the likelihood to a threshold, and, when the likelihood exceeds the threshold, remove the attribute from publication. Other embodiments may be disclosed and/or claimed.

25 Claims, 11 Drawing Sheets

(58) Field of Classification Search
USPC .............................. 705/14.66, 14.52; 726/28
See application file for complete search history.

(56) References Cited

U.S. PATENT DOCUMENTS

| | | |
|---|---|---|
| 2008/0028066 A1 | 1/2008 | Berkhin et al. |
| 2008/0222283 A1 | 9/2008 | Ertugrul et al. |
| 2008/0228767 A1* | 9/2008 | Kenedy et al. .................. 707/6 |
| 2009/0248496 A1 | 10/2009 | Hueter et al. |
| 2010/0024042 A1 | 1/2010 | Motahari et al. |
| 2011/0282964 A1 | 11/2011 | Krishnaswamy et al. |
| 2011/0289590 A1 | 11/2011 | Miettinen |
| 2012/0023334 A1* | 1/2012 | Brickell ............... H04L 9/0844 713/169 |
| 2012/0042253 A1 | 2/2012 | Priyadarshan et al. |
| 2012/0158516 A1 | 6/2012 | Wooten, III et al. |
| 2012/0221701 A1 | 8/2012 | Mair et al. |

FOREIGN PATENT DOCUMENTS

| | | |
|---|---|---|
| KR | 20050014940 A | 2/2005 |
| WO | WO2009/127771 A1 | 10/2009 |
| WO | WO2011/143625 A2 | 11/2011 |

OTHER PUBLICATIONS

Smith, Ned M. "Priorityizing Facts for On-line Trust Negotiation", Intel Corporation, Hillsboro, Oregon, 7 pages.
Krawczyk, Hugo, "SIGMA: the 'SIGn-and-MAc' Approach to Authenticated Diffe-Hellman and its Use in the IKE Protocols", Jun. 12, 2003, 32 pages.
Toubiana, Vincent et al., "Adnostic: Privacy Preserving Targeted Advertising", accessed from http://crypto.stanford.edu/adnostic/ on Sep. 4, 2013, 16 pages.
International Search Report and Written Opinion mailed Sep. 27, 2013 for International Application No. PCT/US2012/071029, 11 pages.
International Search Report an Written Opinion mailed Dec. 11, 2014 for International Application No. PCT/US2014/053589, 13 pages.
Office Action mailed Aug. 11, 2014 for U.S. Appl. No. 13/997,918, 6 pages.
Office Action mailed Aug. 25, 2016 for U.S. Appl. No. 13/997,918, 35 pages.
International Preliminary Report on Patentability mailed Apr. 7, 2016 for International Application No. PCT/US2014/053589, 10 pages.
International Preliminary Report on Patentability mailed Jul. 2, 2015 for International Application No. PCT/US2012/071029, 8 pages.
Extended European Search Report mailed Jul. 22, 2015 for European Application No. 12890250.9, 7 pages.
Notice of Preliminary Rejection mailed Jul. 1, 2016 for Korean Application No. 2015-7013352, 13 pages.
Final Office Action mailed Feb. 24, 2015 for U.S. Appl. No. 13/997,918, 17 pages.
Extended European Search Report mailed Feb. 2, 2017 for European Application No. 14847278.0, 10 pages.
Notice of Allowance mailed Dec. 15, 2016 for U.S. Appl. No. 13/997,918, 38 pages.

* cited by examiner

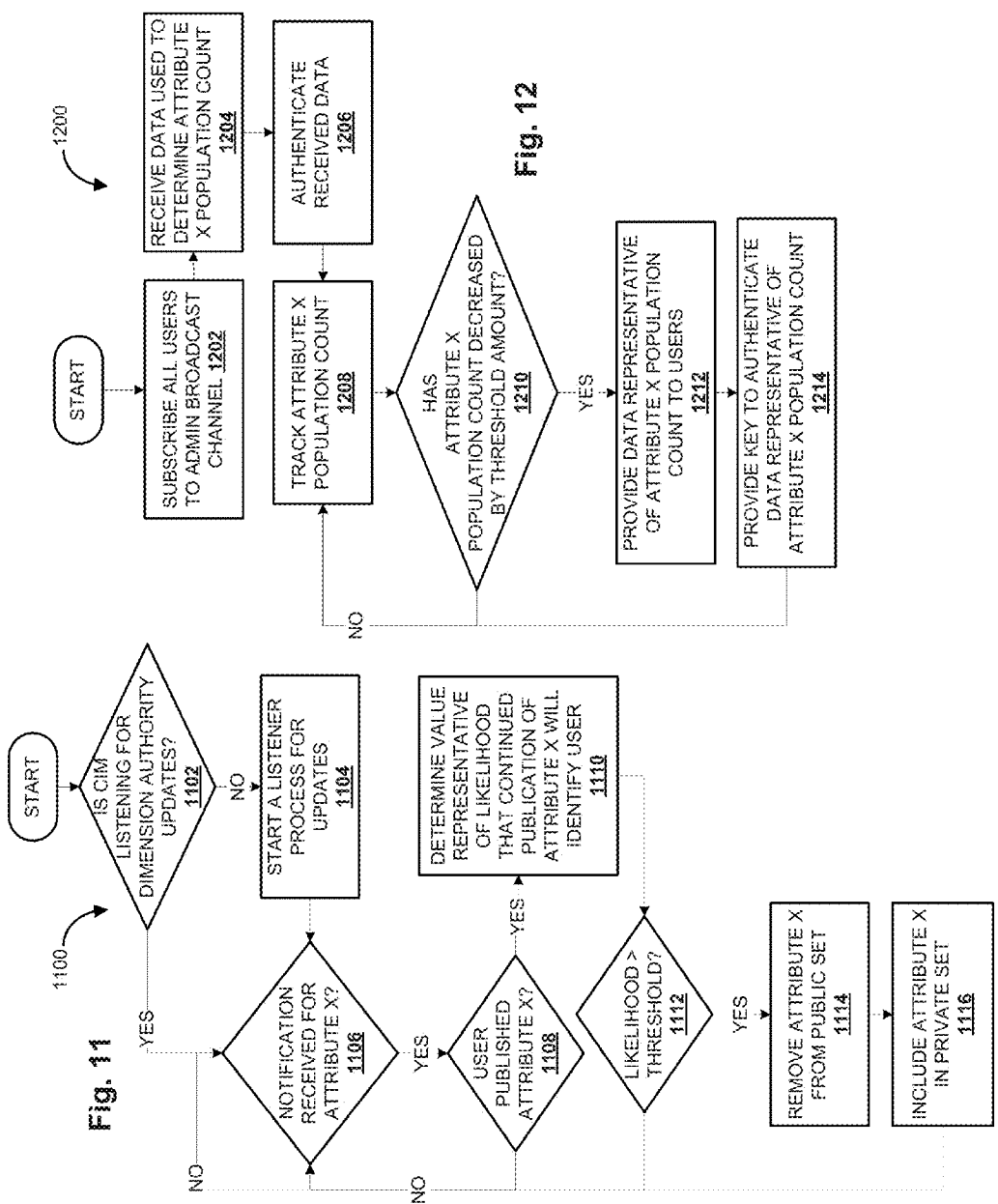

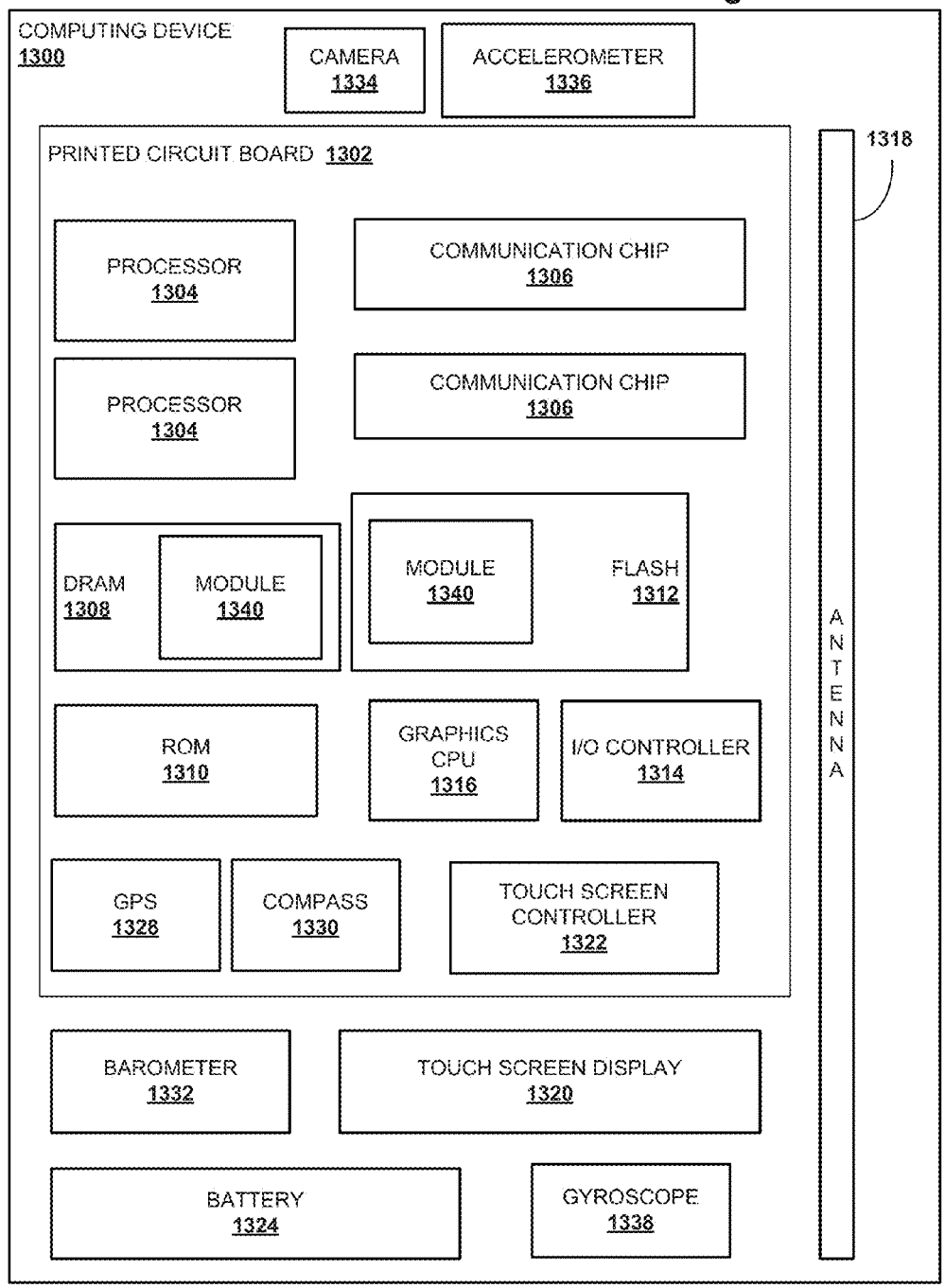

PUBLICATION AND REMOVAL OF ATTRIBUTES IN A MULTI-USER COMPUTING SYSTEM

CROSS-REFERENCE TO RELATED APPLICATIONS

This application is a continuation-in-part of U.S. patent application Ser. No. 13/997,913, filed Jun. 25, 2013, entitled "PROVISION OF ANONYMOUS CONTEXT INFORMATION AND GENERATION OF TARGETED CONTENT," which is a national phase entry under 35 U.S.C. §371 of International Application No. PCT/US2012/071029, filed Dec. 20, 2012, entitled "PROVISION OF ANONYMOUS CONTEXT INFORMATION AND GENERATION OF TARGETED CONTENT." Both applications are hereby incorporated by reference herein in their entireties.

FIELD

Embodiments of the present disclosure generally relate to the field of data processing, and more particularly, to techniques and configurations for provision of anonymous contextual information and generation of targeted content.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Computing device users may knowingly or unknowingly disclose, to various entities over a computer network, information associated with a user or the computing device that may be usable to identify or locate the user, including but not limited to personal information, activities, proclivities, computing environments, relationships (e.g., with people, places or things), computing devices, physical environment, information captured from computing device sensors (or inferences drawn from that information), preferences, patterns of behavior, and/or any other information useful in identifying or understanding a user and his or her interests (collectively "context information").

In return, entities such as advertisers or vendors of goods/services may provide content targeted to the user. The user may benefit from this personalized content by having a better experience with content that is more likely to be relevant or desirable. Entities such as advertisers and vendors may benefit because users are more likely to engage targeted content than untargeted content. However, users may wish to protect their privacy. Disclosure of personal or contextual information to one or more entities over a computer network may enable personal identification of the user and/or other undesirable side effects, such as a precise location of the user. This loss of privacy may lead to damage of the user's reputation, financial well being, and/or safety.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 11 schematically illustrates an example method for post-publication monitoring, which may be implemented by a consumer information manager, in accordance with various embodiments.

FIG. 12 schematically illustrates an example method for post-publication monitoring, which may be implemented by a dimension authority, in accordance with various embodiments.

FIG. 13 schematically illustrates a computing device in accordance with one implementation.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "block," "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. An "entity" may refer to any combination of hardware or software that is configured to interact with other entities, such as a server portion of a client-server application (e.g., a hypertext transport protocol, or "HTTP," server), an application function, a web service, and so forth. As used herein, two components may be said to be "coupled" if an output signal of one is provided as an input signal to the other, with or without passing through one or more intermediary components that may or may not transform or otherwise process the output signal.

Figure 1:
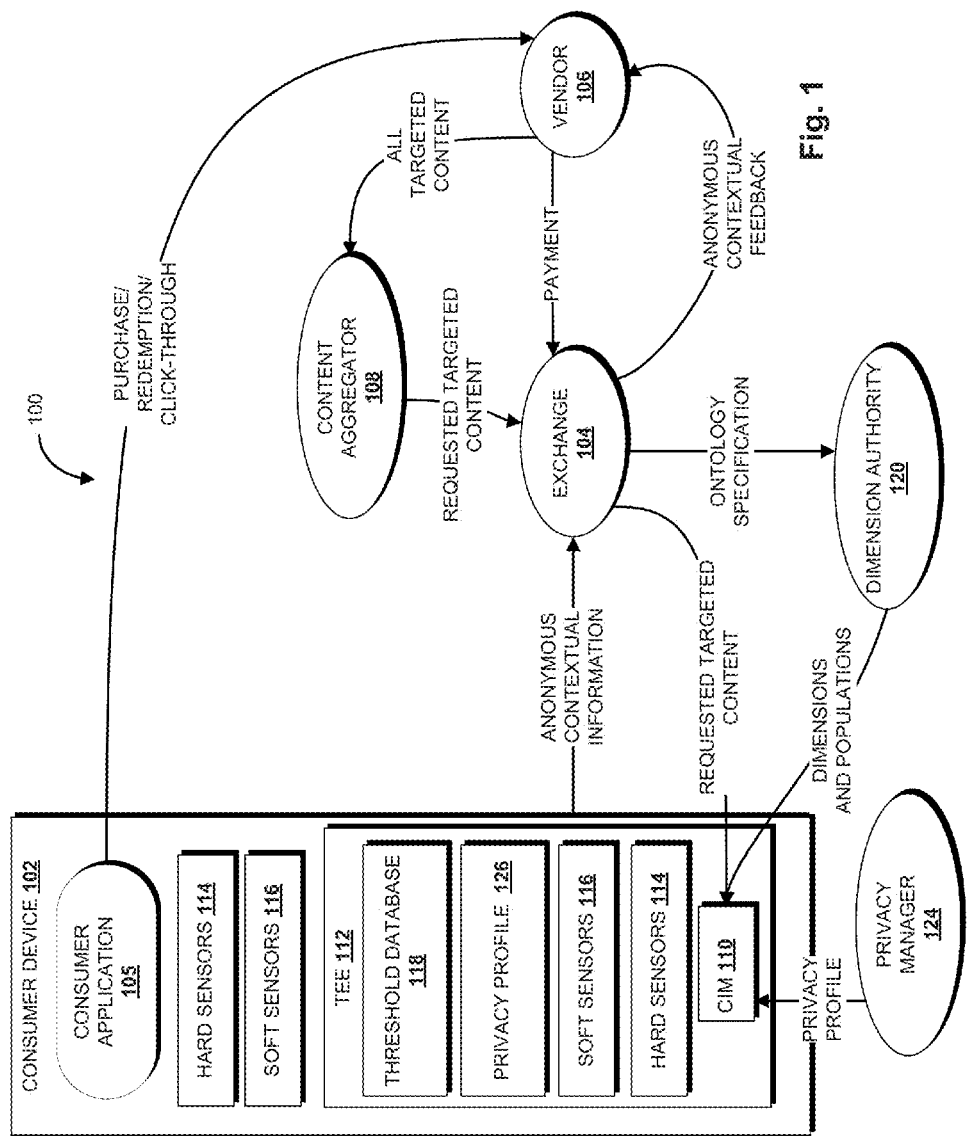
FIG. 1 schematically illustrates an example E-commerce system, in accordance with various embodiments.

With reference to FIG. 1, an example E-commerce system 100 may include one or more entities operating on one or more computing devices in communication with each other via one or more computer networks (not specifically identified in FIG. 1). E-commerce system 100 may be, for example, a cloud service, which service offering may include, but are not limited to, Software as a Service (SaaS), Platform as a Service (PaaS), Infrastructure as a Service (IaaS), or Hardware as a Service (HaaS). The various entities and computing devices may include a user (not shown, also referred to as a "consumer," particularly in the context of E-commerce) operating a computing environment provided in whole or in part by a consumer device 102 to interact with the various other computing devices of E-commerce system 100. The techniques and configurations disclosed herein, frequently illustrated with reference to E-commerce applications, may be applied in any suitable multi-user computing system.

In various embodiments, a "computing environment associated with a user" may refer to one or more physical computing devices associated with a user (e.g., operated by and/or owned the user or someone with which the user has a relationship) and/or functionality provided to a user or users by one or more computing devices. For example, a user may be provided, e.g., by one or more servers of a server farm, with control of a virtual machine that itself provides the user with a software operating environment (e.g., an operating system and one or more applications). In such a scenario, the one or more servers executing the virtual machine, the virtual machine itself, and/or any applications available on the virtual machine may together be considered a computing environment associated with the user.

Consumer device 102 may be any device that processes data, including but not limited to a laptop, a netbook, a notebook, an Ultrabook™, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, a digital video recorder, a portion of a server, a cloud service, and so forth, or a distributed collection of such resources. Although repeatedly referred to herein as a "consumer" device, this is not meant to limit embodiments only to devices used by consumers for purchasing goods or services. Targeted content may be generated for computing devices and/or computing environments used for other purposes as well.

Consumer device 102 may access E-commerce system 100 through various computing devices, which by virtue of the networked communication, may also be referred to as "nodes." In FIG. 1, for instance, consumer device 102 may access E-commerce system 100 by way of an exchange node (also referred to as an "E-commerce exchange") 104. Exchange node 104 may be an entity configured to provide a portal to a user of consumer device 102. In some embodiments, the portal may provide one or more web pages that provide one or more links to content provided by exchange node 104 or content provided by other entities. The user may navigate these web pages and links using a consumer application 105 executing on consumer device 102, such as a web browser. In other embodiments, the portal may provide an interface that enables the users to consume various content, such as videos.

Portals may be of various types. In some embodiments, exchange node 104 may provide an E-commerce portal that enables a user to shop for products and/or services from a plurality of vendors. In some embodiments, exchange node 104 may provide a more general purpose portal that provides access to content from vendors, news organizations, financial services, various interest groups (e.g., technical or cultural organizations) and so forth. In various embodiments, exchange node 104 may provide a portal that includes a search engine interface. In various embodiments, exchange node 104 may include content targeted to a particular user, e.g., as an advertisement on a portion of a graphical user interface.

A vendor 106 may be any entity that buys, offers to buy, sells, offers to sell and/or exchanges goods or services with other entities of the system. Vendor 106 may also generate and/or provide content targeted to users, directly to consumer devices 102 or by way of one or more other entities, as will be described below. In various embodiments, a content aggregator 108 may act as a "middleman" between vendors 106 and the other entities with whom vendors buy/sell products/services. For example, content aggregator 108 may store and make available, e.g., upon request by exchange node 104, targeted content generated by vendors 106.

In traditional E-commerce and other systems, entities such as vendors 106, advertisers (not shown), and so forth may generate targeted content based on contextual information received from consumer device 102. For instance, vendor 106 may track a user's browsing history, purchase history, history of offers redeemed, etc., using various pieces of the user's personal information (e.g., name, address, social security number, financial information, demographic information, location, etc.). Based on this tracked information, vendors 106 may generate content such as advertisements, offers, and coupons that are targeted to the user.

Targeted content may come in various forms, and may be presented to the user for consumption in various ways. In various embodiments, targeted content may include content exchanged via email, simple messaging service ("SMS"), multimedia messaging service ("MMS"), advertisements incorporated onto web pages (e.g., banner ads), and so forth. In various embodiments, content may come in various formats, including but not limited to audio, video, a combination of audio and video, visual, verbal, pictorial, and so forth. In some embodiments where exchange node 104 operates a webpage portal, targeted content may come in the form of banner advertisements, pop up windows, and so forth. In some embodiments where exchange node 104 operates a video portal, targeted content may be in the form of video advertisements interspersed within other video.

Generation and provision of targeted content may benefit vendor 106 and other entities because a user may be more likely to engage targeted content than non-targeted content. Receipt of targeted content may benefit users because by increasing a likelihood that content consumed by the user will be relevant/interesting to the user, and/or by decreasing a likelihood that content consumed by the user will not be relevant (e.g., spam).

A user's personal information that is used to generate/provide targeted content may be stored in multiple locations on a network. For example, multiple vendors from which the user has purchased goods or services may have copies of the user's personal data. The user may be forced to rely on security and other safeguards employed by these multiple vendors in order to prevent unauthorized disclosure of the user's personal information to third parties. The more locations with a user's personal information, the more risk that at least one of those locations will fail to adequately protect that information. Moreover, once a user's personal information is stored on one or more locations on a network, it may be difficult to remove the user's personal information from the network.

Accordingly, in various embodiments, consumer device 102 may not disclose a user's personal information in order to facilitate generation of targeted content, e.g., by vendors 106. Instead, consumer device 102 may be configured to provide or otherwise disclose, to one or more remote computing devices configured to provide targeted content, "anonymous context information" associated with consumer device 102 or a user of consumer device 102.

In various embodiments, anonymous context information may include one or more "dimensions." In various embodiments, a dimension may include an attribute of the user or a computing environment associated with the user, and a population count of users or computing environments sharing the attribute. An attribute of a computing environment associated with a user may include an attribute of one or more physical computing devices associated with the user (e.g., operated by and/or owned the user or someone with which the user has a relationship), an attribute of a virtual machine provided for use by the user or someone with which the user has a relationship, an attribute of software associated with the user (e.g., operated by and/or owned the user or someone with which the user has a relationship), context data (e.g., temperature, velocity, location, etc.) sensed by a computing device associated with the user or someone with which the user has a relationship, and so forth.

Dimensions, and more particularly, dimension attributes, may be selectively disclosed to facilitate generation and/or provision of content targeted towards consumer device 102 or its user, without enabling user identification. In various embodiments, a dimension attribute, alone or in combination with other dimension attributes, may serve as indicators of a user's willingness to engage certain content.

In various embodiments, a dimension may be expressed as a tuple, <attribute, population count>. For example, a computing environment may have the dimension <"iPhone", 37M>, which means a user is operating an iPhone, and that there are currently 37 million iPhone users. In various embodiments, attribute itself may be a measure (e.g., "iPhone") or a tuple, <attribute, measure> (alternatively expressed as attribute.measure). For example, a computing device may have the dimension <location.Portland, 1.3M>. As used herein, the terms "dimension attribute" and "attribute" may refer to either a standalone attribute (e.g., "iPhone") or an attribute.measure tuple (e.g., phoneType.iPhone).

In some embodiments, dimensions may be expressed as an ontology or taxonomy, e.g., of dependent dimension attributes. For example, a dimension taxonomy may be expressed as "car→ford→pickup→red". Each attribute measure (except car) may be a specialization of the value to its left, and may have an associated population count (e.g., of users owning vehicles sharing that dimension attribute).

In various embodiments, consumer device 102 may include a consumer information manager ("CIM") 110. CIM 110 may be logic implemented with any combination of hardware and software. In various embodiments, CIM 110 may be configured to, among other things, control provision and/or disclosure of anonymous contextual information, to protect the user's privacy while enabling generation and/or provision of targeted content for the user. In various embodiments, CIM 110 may be implemented in a trusted execution environment ("TEE") 112 of consumer device 102. TEE 112 may come in various forms or be provided by various technologies, such as Trusted Execution Technology ("TXT") and the Trusted Platform Module ("TPM") by the Intel Corporation of Santa Clara, Calif., Manageability Engine ("ME"), the TrustZone Security System by ARM Holdings in Cambridge, United Kingdom, Virtualization Technology ("VT-x"), or ucode enforced thread and memory access isolation. A "consumer information manager" or "consumer information management device," as used herein, may refer to any combination of hardware and software, distributed between one or more physical computing devices, that implements one or more of the features of CIM 110 disclosed herein.

Dimension attributes of consumer device 102 may have various measures, including, but not limited to, data sensed by one or more "hard" sensors 114 of consumer device 102, a computer-readable address of consumer device 102 (e.g., IP address, MAC address), hardware or software configuration/capabilities of consumer device 102, and so forth. Hard sensors 114 may include a variety of sensors, such as a global positioning system ("GPS"), barometer, thermometer, accelerometer, and so forth, that may provide contextual data about consumer device 102. Hard sensors 114 may be employed in various portions of consumer device 102. For example, in FIG. 1, hard sensors 114 may be employed on consumer device 102 both within and outside of TEE 112.

Dimension attributes of a user of consumer device 102 may have various measures, including, but not limited to, demographic information about the user, such as age, socio-economic status, gender, group affiliations (e.g., political party, group membership), physical attributes (e.g., hair color, eye color, body type, fitness level), occupation, family status (e.g., married, number of children), and so forth. Dimension user attributes may also include information about and/or probative of proclivities/affinities of the user, such as past purchase history, preferences for various products, past coupon or offer redemption history, hobbies, relationships, affiliations, and so forth.

In various embodiments, dimension attributes of the user may be obtained from one or more "soft" sensors 116. Soft sensors 116 may include any combination of hardware and/or software, on consumer device 102 or elsewhere. Soft sensors 116 may be configured to obtain various user dimension attributes from within consumer device 102 or elsewhere, such as a user's schedule (e.g., from an online calendar), demographic data (e.g., from various online accounts such as a social network), relationships (e.g., from a social network), history (e.g., past purchases, past redemptions, records of past engagements, browsing history, etc.) or proclivities (e.g., from a social network and/or an interest graph).

In various embodiments, dimension attributes may be selectively disclosed by CIM 110, or a recommendation may be selectively provided to the user as to the advisability of disclosure, based on a likelihood that disclosure of the dimension attribute will enable identification of the user, to comply with a risk tolerance associated with the user.

Disclosure of one or more dimension attributes of consumer device 102 or a user thereof may enable, e.g., exchange node 104, to request content (e.g., advertisements, coupons, offers, etc.) that is targeted towards the one or more dimension attributes. For instance, assume consumer device 102 selectively broadcasts two dimension attributes of a user—"diet.vegan" and "location. Portland, Oreg."—to exchange node 104. Exchange node 104 may request, e.g., from content aggregator 108, content targeted towards these dimension attributes. Content aggregator 108 may search targeted content it obtained from vendor 106 to find targeted content such as advertisements, offers or coupons for vegan-style restaurants in Portland, Oreg., and provide them to exchange node 104. In some embodiments, targeted content may be injected (e.g., by content aggregator 108 or vendor 106) with metadata describing one or more attributes to which the content is targeted. Exchange node 104 may in turn provide the targeted content to consumer device 102, e.g., as search results or banner advertisements on a webpage.

The user of consumer device 102 may then have the ability to engage the targeted content, e.g., by redeeming a coupon to a particular restaurant, ordering food from a particular vegan restaurant, or by clicking through one or more links in the targeted content. Vendor 106 or content aggregator 108 may "learn" from engagement of a particular targeted content that the content was appropriately targeted towards the two dimension attributes. Over time, these entities may continue to "learn" from subsequent user engagements of targeted content, and may tailor future targeted content accordingly.

The likelihood that disclosure of one or more dimension attributes will enable identification of the user may be based at least in part on an associated population count of the dimension (e.g., computing environments or users sharing the dimension attribute). For example, the dimension attribute "location.Portland" may have a large population count at any given moment. However, relatively few people will have a dimension attribute "location.Fifth and Broadway" at any given moment. CIM 110 may use a dimension population count to determine whether the corresponding dimension attribute is "safe" to disclose. If the user's dimension attribute is currently "location.Fifth and Broadway," then disclosure of this dimension attribute may be more likely to enable identification (or pinpoint location) of the user than if it were "location.Portland." In such case, CIM 110 may disable or otherwise prevent consumer device 102 from providing this dimension attribute, or may "anonymize" this dimension attribute, e.g., by providing a less granular location characteristic (e.g., "Oregon") or by injecting entropy into the location. In some embodiments, such techniques for determining whether an attribute is "safe" to disclose, and/or techniques for anonymizing attributes, may be performed after disclosure of the attribute in response to changes in system 100 which may present an increased privacy risk to the user (e.g., a decrease in the population count of users disclosing a particular attribute). Post-publication monitoring techniques are discussed below with reference to FIGS. 9-12.

A risk tolerance of a user may be defined in various ways. In some embodiments, a risk tolerance of a user may be represented by one or more so-called "anonymity thresholds." Prior to disclosing anonymous context information, CIM 110 may calculate a so-called "anonymity index" based on the dimensions of the anonymous context information to be disclosed and population counts of each dimension. CIM 110 may then compare the anonymity index to one or more appropriate anonymity thresholds, e.g., associated with an entity to which consumer device 102 would be disclosing or with a dimension having an attribute to be disclosed. In various embodiments, anonymity thresholds for entities and dimensions may be maintained in a threshold database 118.

A user may have various levels of trust in entities to which the user discloses anonymous context information. Accordingly, in various embodiments, a different anonymity threshold may be maintained, e.g., by CIM 110 in threshold database 118, for each entity to which a user discloses data. For example, an anonymity threshold associated with a particular vendor 106 may reflect a relatively high level of user trust, e.g., based on a history of interaction with that vendor 106. An anonymity threshold associated with an untrusted entity, such as exchange node 104 or a "publish-and-subscribe" ("P&S") server (not shown in FIG. 1 but described below), may reflect a considerably lower level of trust.

Users may be provided with the ability to manually configure their risk tolerances, e.g., by raising or lowering anonymity thresholds associated with various entities or dimensions. However, this task may prove too complicated for some users, and too onerous for most. Accordingly, in various embodiments, a privacy manager 124 may ensure that a user's privacy interests are managed. Privacy manager 124 may provide advice to the user and/or configure CIM 110 on the user's behalf to appropriately protect the user's privacy interests, while still enabling the user to disclose or otherwise provide sufficient dimension attributes to facilitate provision of targeted content. In some embodiments, privacy manager 124 may be a service provider, such as a lawyer, an accountant, or a financial planner, or an entity such as a corporation. In other embodiments, privacy manager 124 may be any combination of hardware and software operating on consumer device 102 and/or elsewhere (e.g., a web service).

In various embodiments, a dimension authority 120 may be configured to track a count of computing environments or users that share a dimension attribute. Such a count may be referred to herein as a "population" or "population count." In various embodiments, dimension authority 120 may provide, or otherwise make available, dimensions, including their attributes and population counts, to other network entities. For example, dimension authority 120 may provide dimensions to CIM 110, e.g., to enable CIM 110 to selectively disclose dimension attributes in exchange for content targeted towards consumer device 102 or its user. Dimension authority 120 may also provide dimensions to content providers or generators such as vendor 106, e.g., to enable content providers to selectively generate content targeted towards attributes of those dimension. In some embodiments, dimension authority 120 may monitor engagement with targeted content as an attribute, and provide, or otherwise make available, dimensions identifying targeted content and the population counts of users engaged with the identified targeted content. Dimension authority 120 may be implemented with any combination of hardware and software, on a single computing device or across multiple computing devices. A "dimension authority" or "dimension authority device," as used herein, may refer to any combination of hardware and software, distributed between one or more physical computing devices, that implements one or more of the dimension authority features disclosed herein.

Dimensions may be created in various ways for various reasons. In various embodiments, dimension authority 120 may receive, e.g., from exchange node 104 or vendor 106, an ontology specification including one or more potential dimension attributes of computing environments or users to be tracked. For instance, exchange node 104 may select computing environment or user attributes for tracking based on user behavior (e.g., keyword searches by users, etc.), and provide a resultant ontology specification to dimension authority 120. Dimension authority 120 may be configured to create a dimension and track a population of computing devices or users having the dimension attribute.

In many online social media communities, E-commerce systems, and cloud services, users have many opportunities to share information with users and entities that they know, as well as with strangers. Users may share information (e.g., an attribute) with the expectation that its publication does not pose a privacy risk (e.g., using the techniques disclosed herein for selectively allowing or recommending disclosure of various attributes based on the results of a privacy analysis). However, if the context or nature of the disclosed information changes after it has been shared, the user's privacy may be compromised even though the user took no additional affirmative action. For example, if the population of users publishing a same or related attribute (e.g., a preference for pizza or calzones) decreases (e.g., because pizza is found to cause a disease), an attribute that was not a privacy risk when initially published may become a privacy risk.

To address this vulnerability, in various embodiments, after an attribute is disclosed (or "published"), CIM 110 may selectively remove from publication (or "unpublish") the attribute if changes in system 100 have changed the privacy risk associated with disclosure of that attribute. CIM 110 may be configured to perform post-publication monitoring (e.g., as discussed below with reference to FIGS. 9-12) to identify and unpublish attributes that pose an unacceptable risk of identification (or advise the user of the increased risk). Embodiments of system 100 that include post-publication monitoring capability may improve the relationship between users of system 100 and other entities, such as content providers and vendors, by giving users feedback on the use and exposure of their data. This feedback may encourage users to overcome initial fears regarding disclosure, while managing legitimate privacy risks as they arise.

Figure 2:
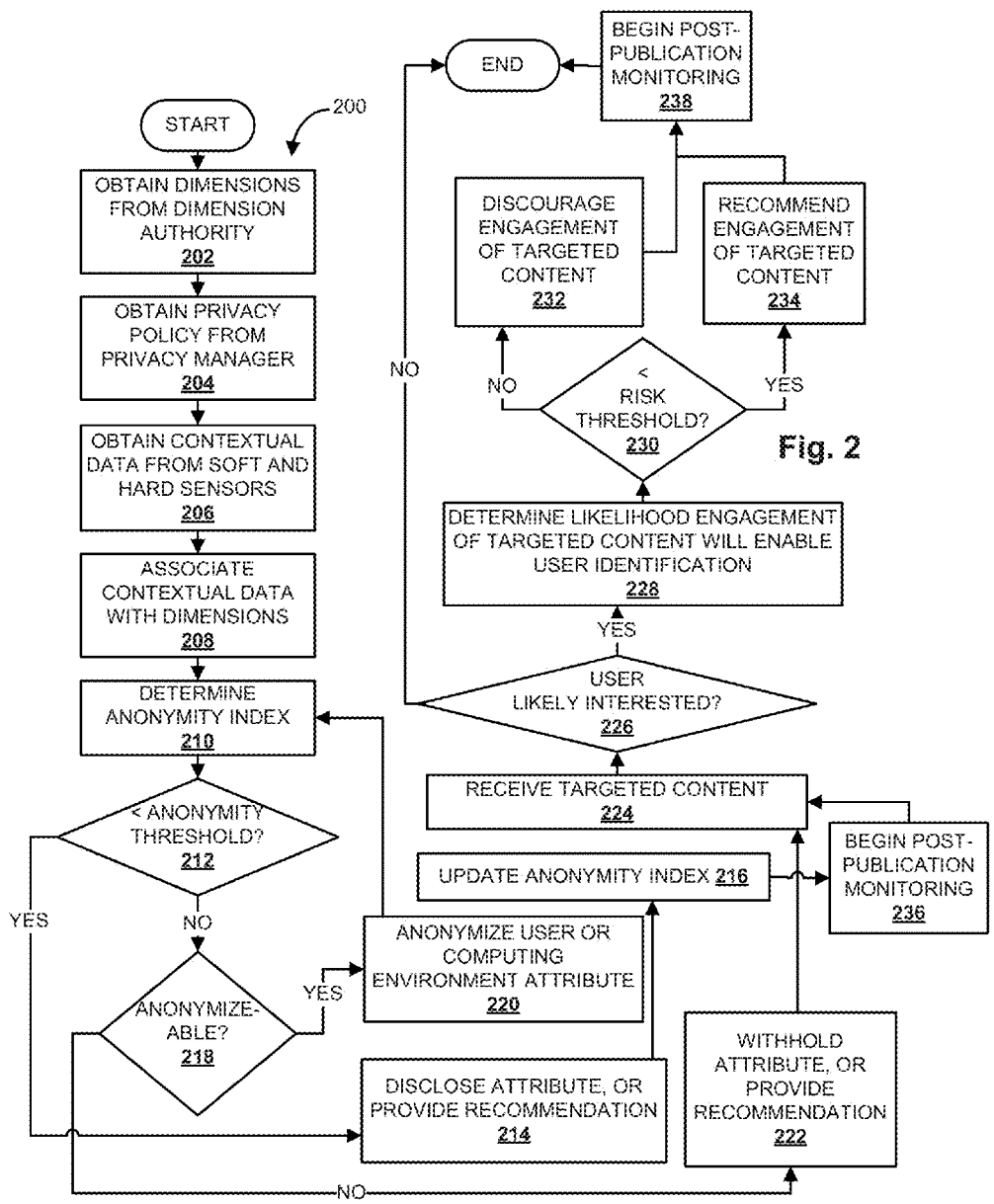
FIG. 2 schematically illustrates an example method that may be implemented on a consumer device, in accordance with various embodiments.

FIG. 2 depicts an example method 200 that may be implemented on consumer device 102, e.g., by CIM 110. At block 202, CIM 110 may obtain, from dimension authority 120, dimensions, including dimension attributes and corresponding counts of users or consumer devices sharing those dimension attributes. In various embodiments, dimension authority 120 may only provide dimensions to computing devices (e.g., consumer device 102) that are able to authenticate themselves to dimension authority 120. In some embodiments, computing devices may be preconfigured (e.g., during manufacturing) with data, such as an "enhanced privacy identifier," or "EPID," necessary to authenticate themselves to dimension authority 120. In some cases, this preconfigured data may be unavailable for use in any other way. Additionally, dimensions provided by dimension authority 120 (e.g., upon authentication of consumer device 102) may be signed by a symmetric or asymmetric key, which may be referred to herein as a "dimension key."

A dimension key may be any data configured to enable authentication of the source of the data and/or that the data itself is authentic. Consumer device 102 may sign dimension attributes it discloses later with the dimension key. In this manner, the receiving entities (e.g., exchange node 104, vendor 106) may also be able to confirm the authenticity of the dimension attributes. Use of dimension keys in this manner may prevent unauthorized parties from propagating false dimension attributes. For example, a first competitor may be prevented from providing false dimension attributes to a second competitor, in an effort to make the second competitor falsely believe that particular dimension attributes exist and/or are compelling to consumers.

At block 204, CIM 110 may obtain a privacy profile 126 from privacy manager 124. For example, if privacy manager 124 is a hired service provider, he or she may locally or remotely operate an interface provided by CIM 110 to configure one or more anonymity thresholds associated with the user. If privacy manager 124 is logic (hardware and/or software on consumer device 102 and/or elsewhere), it may provide configuration data to CIM 110 that enables CIM 110 to make decisions with regard to disclosure of dimension attributes of the user or consumer device 102.

At block 206, CIM 110 may obtain contextual data from one or more sources, e.g., on consumer device 102 or elsewhere, e.g., hard sensors 114 and/or soft sensors 116.

At block 208, CIM 110 may associate the contextual data with dimensions it obtained at block 202. For example, assume "location" is a dimension obtained from dimension authority 120, and that CIM 110 receives GPS coordinates from a GPS sensor of consumer device 102 that indicates that consumer device 102 is located in Portland, Oreg. CIM 110 may assign the location dimension's attribute the value of the sensed GPS coordinates, e.g., to yield a dimension attribute measure of "Portland." As noted above, each dimension may have an associated count of users or devices sharing the dimension attribute. In this example, a count for the "location" dimension attribute measure "Portland" may include all users or devices that are located, or were last known to be located, in Portland.

Before disclosing any contextual information, CIM 110 may determine a likelihood that disclosure will enable identification of the user in a variety of ways. For example, at block 210, CIM 110 may calculate an anonymity index based on one or more population counts of one or more dimensions to be disclosed. In various embodiments, an anonymity index may be calculated using a formula such as equation (1):

$$\text{anonymity\_index} = 1 - \sum_{i=0}^{n} \frac{1}{\log_2 d_i} \quad (1)$$

where $d_i$=population count of dimension i; n=the number of dimensions; and i, n and d are all positive integers. In various embodiments, an anonymity index value of one means the user is absolutely anonymous, and an anonymity index value of zero means the user would be uniquely identifiable based on the disclosure. In various embodiments, anonymity index values<0.8 may represent high risk that disclosure of the dimension attributes will enable identification of the user, whereas anonymity index values>0.9 may be considered safe.

It may be assumed, from a privacy perspective, that an entity to which one or more dimension attributes are disclosed is likely to retain those dimension attributes in an attempt to use with later-disclosed dimension attributes to identify or locate a user. Accordingly, in various embodiments, an anonymity index may be calculated based on both currently-pending dimension attribute disclosures and past disclosures of dimension attributes.

For instance, in various embodiments, prior to disclosure of one or more dimension attributes to a particular entity, when the anonymity index is calculated, one or more anonymity indices calculated prior to disclosure to the same entity may be taken into account, e.g., to yield a cumulative anonymity index. For example, in various embodiments, an average of anonymity indices calculated for past disclosures to the particular entity may be averaged with the most recently calculated anonymity index for the entity. In various embodiments, this cumulative anonymity index, rather than the most recently calculated anonymity index, may be used to determine a likelihood that disclosure will enable user identification.

As another example, dimension attributes disclosed to an entity may be tracked over time, e.g., by CIM 110. Whenever a user wishes to disclose additional dimension attributes to the entity, all disclosures to that entity, past and present, may be used as input to equation (1), above. For example, a user may disclose three dimension attributes to a particular vendor 106. Assuming the user had never before disclosed any dimension attributes to that vendor 106, equation (1) may be used to calculate the cumulative anonymity index with n=3. Later, the user may disclose two additional dimension attributes (e.g., different that the three disclosed previously) to the same vendor 106. At that time, the cumulative anonymity index may be calculated using equation (1) with the three previously disclosed dimension attributes (including their associated population counts at the time of disclosure) and the two new dimensions, and with n=5. In this way, the more dimension attributes a user discloses to a particular entity over time, the closer the anonymity index may get to an anonymity threshold.

Referring back to FIG. 2, CIM 110 may then determine whether a likelihood that disclosure of the dimension attributes will enable user identification comports with a risk tolerance of the user. For example, at block 212, CIM 110 may determine whether the anonymity index calculated at 210 is less than an anonymity threshold associated with a particular recipient entity or dimension with an attribute to be disclosed. Although not shown in FIG. 2, in some embodiments, CIM 110 may also take into consideration a security level of a computer system (e.g., a router, firewall and/or gateway) and/or a network through which a disclosed attribute would pass.

If the answer at block 212 is yes, then at block 214, CIM 110 may either enable consumer device 102 to disclose the one or more dimension attributes to one or more remote computing devices, or provide a recommendation to the user that disclosure will comply with the user's risk tolerance. For example, if the user is visiting exchange node 104 (e.g., using a web browser), CIM 110 may provide one or more non-user-identifying dimension attributes to exchange node 104, or inform the user that it would be "safe" to do so.

In various embodiments, assuming the dimensions attributes are disclosed at block 214, CIM 110 may first alter or otherwise obfuscate a network address (e.g., IP address) of consumer device 102, e.g., using randomization or network address translation. This may prevent exchange node 104 from being able to identify consumer device 102 based on a communication from consumer device 102 providing anonymous context information. Additionally or alternatively, CIM 110 may enable consumer device 102 to broadcast (or multicast) anonymous context information, e.g., via a P&S server. At block 216, CIM 110 may update the anonymity index to reflect the disclosure.

At block 236, CIM 110 may begin a post-publication monitoring process. A post-publication monitoring process may be continuously or periodically performed after a user discloses an attribute to determine whether any aspect of system 100 has changed since disclosure in a manner that increases the privacy risk associated with disclosure of the attribute. For example, a user may disclose that he or she has a particular medical condition (e.g., acne). At the time of disclosure, this attribute may have been relatively common; in other words, many other users of system 100 may have disclosed the same attribute. Consequently, CIM 110 may have determined at blocks 212 and 214 that the anonymity threshold was not exceeded and that disclosure was appropriate. However, if a cure for the medical condition is developed after publication, the number of other users reporting that they have the condition may decrease from its value at the time that the user published the attribute. Consequently, the attribute may correspond to a much smaller population of users, and thus may present an increased privacy risk. A post-publication monitoring process initiated at block 236 may include communication between CIM 110 and dimension authority 120 to monitor decreases in the population of users that have published a particular attribute (or other changes in system 100 that indicate an increased privacy risk) and to unpublish unacceptably risky attributes accordingly. Embodiments of post-publication monitoring techniques and configurations are discussed below with reference to FIGS. 9-12.

If CIM 110 determines at block 212 that the anonymity index calculated at 210 is not less than an anonymity threshold associated with a particular recipient entity or dimension with an attribute to be disclosed, then at block 218, the CIM 110 may determine whether it is possible to "anonymize" the attributes-to-be-disclosed to decrease the likelihood that disclosure will enable user identification. Anonymous context information may be anonymized in various ways. For example, entropy injection may be employed (e.g., randomizing GPS coordinates, network address, other identifier), or dimension attributes of the anonymous context information may be altered (e.g., added, excluded, modified, obfuscated, substituted). For instance, an attribute of a dimension having a large population count may be added to the data that is disclosed. As another example, a dimension attribute with a small population (e.g., proclivity for Irish folk music) may be abstracted to an attribute with a larger population (e.g., proclivity for music).

After anonymization, method 200 may proceed back to blocks 210-212, where CIM 110 again may calculate the anonymity index and determine whether it is less than with an anonymity threshold associated with a particular recipient entity or dimension attribute to be disclosed. If the answer is yes, then method may proceed to block 214 as described above.

However, if the answer is still no, then at block 218, CIM 110 may determine whether the data can be anonymized further. If the answer is yes, the anonymous context information may be anonymized again at block 220 and retested at blocks 210-212. But if the answer at block 218 is no, then at block 222, CIM 110 may either make a decision on behalf of the user and withhold the anonymous context information, or CIM 110 make provide a recommendation to the user indicating that disclosure of the anonymous context information poses a risk of user identification that does not comply with the user's risk tolerance.

Regardless of whether CIM 110 provides the anonymous context information in its original or anonymized form, or withholds provision of the anonymous context information, consumer device 102 may then await receipt of targeted content. If consumer device 102 provided the anonymous context information at block 214, then received targeted content may be based on that anonymous context information. If consumer device 102 withheld anonymous context information at block 222, then received targeted content may be based on other anonymous context information provided by consumer device 102 at another time.

At block 224, consumer device 102 may receive targeted content, e.g., from exchange node 104 on behalf of content aggregator 108 and/or vendor 106, or from a P&S server (described below). For example, consumer device 102 may receive a communication such as an email or text, or if visiting a portal may be presented with a targeted advertisement intended to be displayed in the margin of the portal's webpage.

At block 226, CIM 110 may determine whether the user is likely going to be interested in the received targeted content. This determination may be made based on various information, such as one or more dimensions of the user or consumer device 102, context data obtained from hard sensors 114 and/or soft sensors 116, metadata injected into the targeted content (e.g., by vendor 106), and so forth. If the answer is no, then CIM 110 may not make the targeted content available to the user for consumption (e.g., filtering out SPAM, refrain from displaying ad unit in margin), and method 200 may end.

If, however, the answer at block 226 is yes, then at block 228, CIM 110 may determine a likelihood that engagement of the targeted content (e.g., purchasing a good or service, clicking through a link, redeeming a coupon, etc.) will enable identification of the user. This determination may be made based on various empirical data. For instance, CIM 110 may determine a likelihood that use of a particular payment technology (e.g., digital cash, credit card, PayPal®) to purchase a good or service will enable identification of the user.

At block 230, CIM 110 may determine whether the likelihood that engagement of the targeted content will enable identification of the user exceeds the user's risk tolerance. If the answer at block 230 is yes, then at block 232, CIM 110 may discourage engagement of the targeted content. For instance, CIM 110 may cause a notification to be provided to the user (e.g., via a pop-up window) recommending that the user not redeem the coupon or click through the link. If the answer at block 230 is no, however, then at block 234, CIM 110 may recommend or otherwise approve engagement by the user of the targeted content. In some embodiments, prior to engagement, CIM 110 may alter or otherwise obfuscate a network address (e.g., IP address) of consumer device 102, e.g., using randomization or network address translation. This may prevent vendor 106 from being able to identify consumer device 102 based on a communication from consumer device 102 engaging the targeted content.

At block 238, CIM 110 may begin a post-publication monitoring process. As discussed above, a post-publication monitoring process may be continuously or periodically performed after a user discloses an attribute to determine whether any aspect of system 100 has changed since disclosure in a manner that increases the privacy risk associated with disclosure of the attribute. However, a post-publication monitoring process is not limited to published attributes, but may be used to reevaluate the privacy implications of any action taken within system 100. For example, at block 230, CIM 110 may have determined that engagement with the targeted content did not violate a risk threshold, and thus engagement was recommended. However, if the behavior of other users of system 100 changes such that engagement with the targeted content increases the user's privacy risk (e.g., because fewer users now engage with the particular content), CIM 110 may use a post-publication monitoring process to continuously or periodically update the risk to a user's privacy arising from continued engagement. Embodiments of post-publication monitoring techniques and configurations are discussed below with reference to FIGS. 9-12.

Figure 3:
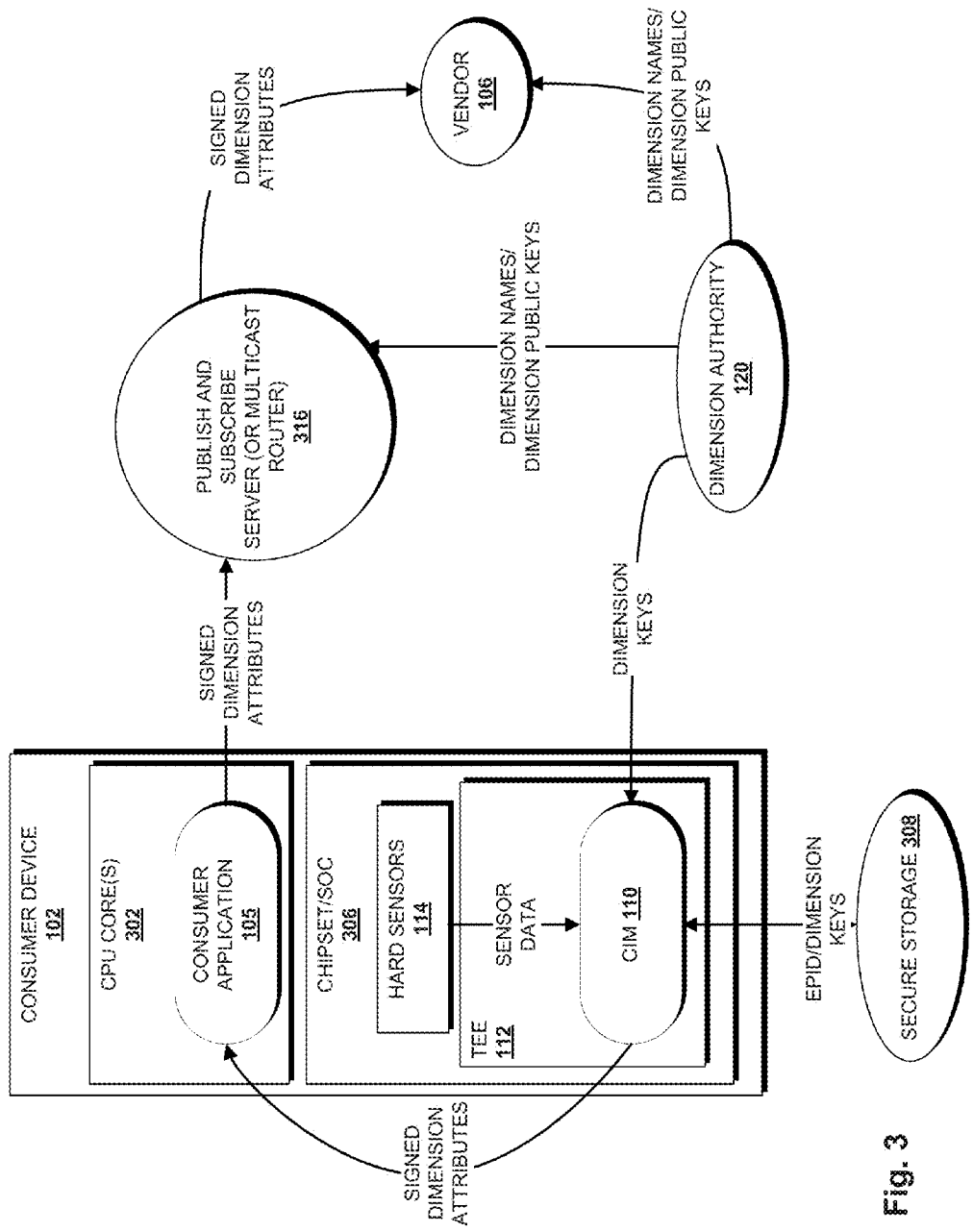
FIG. 3 schematically illustrates an example E-commerce exchange, in accordance with various embodiments.

FIG. 3 depicts consumer device 102 engaged in an exchange with a variety of different entities on the network, and illustrates various aspects of embodiments of the present disclosure. Consumer device 102, e.g., via CIM 110, may participate in a P&S exchange using one or more dimension attributes of the user or consumer device 102. Components of consumer device 102 pertinent to these aspects are depicted; other components from FIG. 1 may or may not be present in consumer device 102. Also, some additional components that may be found in consumer devices 102 are shown in FIG. 3 that are not shown in FIG. 1 (but may or may not nonetheless be present). For instance, consumer device 102 may include one or more processing units, depicted in FIG. 3 as one or more processing cores 302. One or more processing cores 302 may operate consumer application 105. One or more processing cores 302 may be coupled with a chipset 306 (or in some cases, a system on chip, or "SoC").

Chipset 306 may include various components that are not depicted in FIG. 3 but are often found on chipsets or SoCs, e.g., input/output ports, controllers, memory, etc. In various embodiments, chipset 306 may include hard sensors 114, such as the GPS and other sensors described throughout this disclosure. In this particular embodiment, chipset 306 may also include TEE 112. However, in other embodiments, such as embodiments in which TEE 112 is implemented using TXT, VT-x, TrustZone or other ucode based isolation mechanisms, TEE 112 may reside elsewhere, such as in plurality of cores 302.

In various embodiments, CIM 110 may be configured to authenticate consumer device 102 to various entities, e.g., dimension authority 120. Consumer device 102 may include secure storage 308 for storage of various data in a secure manner. In some embodiments, secure storage 308 may be remote from consumer device 102 and accessible, e.g., via a secure protocol. In other embodiments, secure storage 308 may be part of consumer device 102, e.g., accessible from within TEE 112.

In various embodiments, the EPID mentioned above may be stored in secure storage 308. The EPID may be used by CIM 110 to establish trustworthiness of, or "endorse," consumer device 102, e.g., to dimension authority 120, without enabling identification of a user of consumer device 102 and/or consumer device 102 itself. In various embodiments, the EPID, and in particular, an EPID private key, may be provisioned to consumer device 102, e.g., during manufacturing. In some embodiments, the EPID private key may be stored in secure storage 308. In various embodiments, EPID private keys may be indistinguishable from other private keys. Accordingly, signing communications with the EPID private key may not disclose personal information about a user or consumer device 102.

In various embodiments, an EPID public key may be distributed, e.g., by CIM 110 or an original equipment manufacturer ("OEM"), to verifying entities such as dimension authority 120. A single EPID public key may be configured to facilitate verification of multiple corresponding EPID private keys. The verifying entity may be able to determine that a particular private key is valid. However, in various embodiments, the verifying entity may not be able to identify which consumer device 102 provided the EPID private key. Accordingly, an identity of a user of consumer device 102 remains protected.

As noted above, in some embodiments or scenarios, consumer device 102 may broadcast or otherwise provide anonymous context information via the P&S paradigm. A P&S server 316 may be configured to provide "channels" between "subscribers," such as users of consumer devices 102, and "publishers," such as vendors 106 and other entities to which anonymous context information data may be provided. In some embodiments, users may subscribe in channels in which they have interest. Vendors 106 and other publishers (e.g., content aggregator 108, exchange node 104) may publish messages to channels, rather than directly to subscribers. In some embodiments, instead of or in addition to P&S server 316, a multicast router (not shown) may be employed.

In various embodiments, CIM 110 may be configured to provide signed dimension attributes to P&S server 316. Signed dimension attributes may include one or more dimension attributes of the user or consumer device 102, along with a digital signature or other similar data authenticating the user or computing device/environment to the dimension. In various embodiments, dimension attributes may be signed with a dimension key. As described above, a dimension key may be used by various entities, such as P&S server 316 or vendor 106, to verify that a dimension attribute is part of a legitimate dimension, e.g., tracked by a legitimate dimension authority, rather than an illegitimate dimension propagated to, e.g., create a false impression that a dimension attribute has a significant population. In various embodiments, each dimension tracked by dimension authority 120 may have its own dimension key that is only provided to consumer devices 102 that are able to authenticate themselves, and to other entities such as vendors 106 or exchange node 104 that may be authenticated in various ways. In embodiments where dimensions may be expressed as a taxonomy (e.g., car→red→four door→manual), each level of the taxonomy may have its own dimension key.

In various embodiments, the dimension attributes provided by consumer device 102 may be associated, e.g., by dimension authority 120, with one or more channels subscribed to by other consumer devices having the same dimension attributes. In some embodiments, CIM 110 may be configured to only permit subscription to channels associated with dimensions having population counts that comply with a risk tolerance (e.g., anonymity threshold) of the user of consumer device 102.

Figure 4:
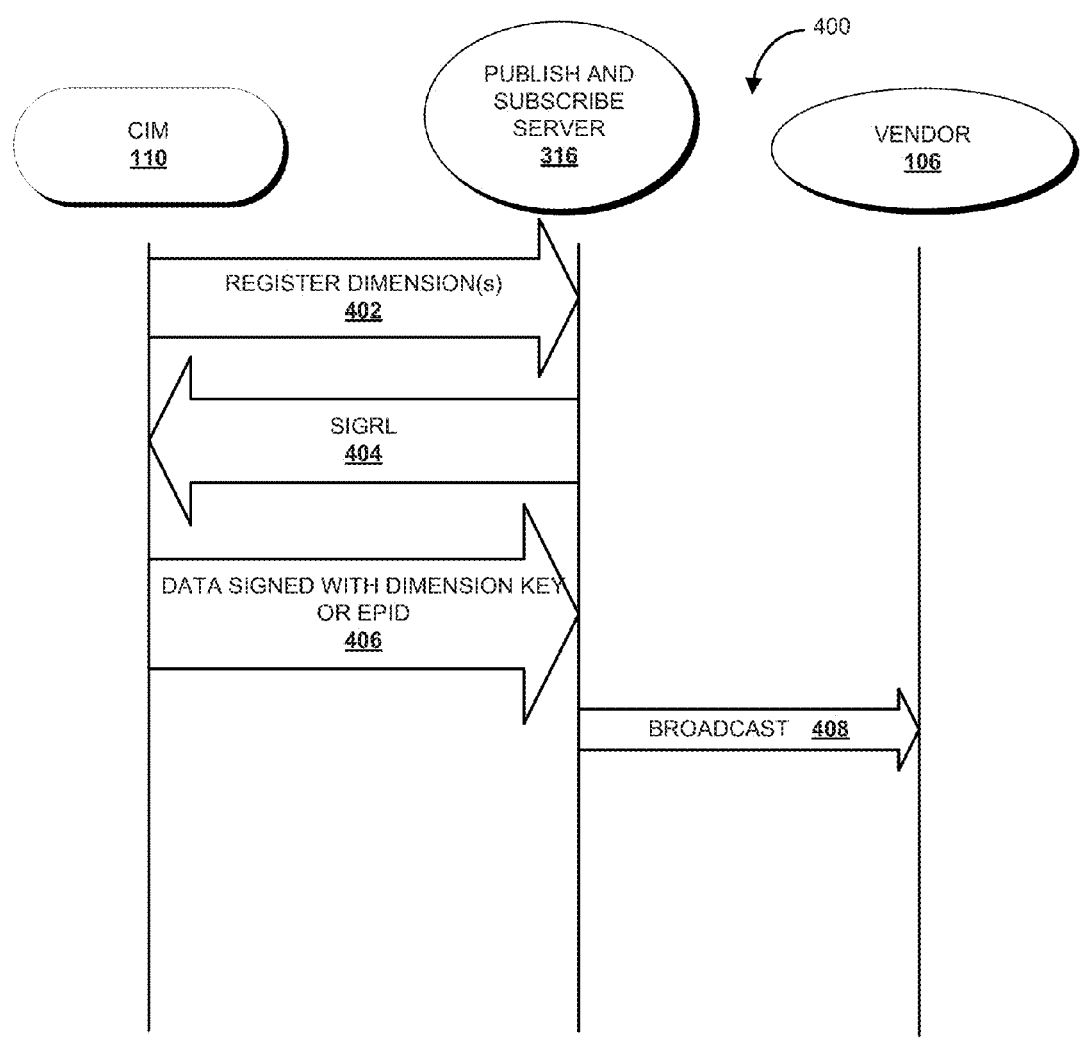
FIG. 4 schematically illustrates an example publish-and-subscribe exchange in which a consumer device uses a publish-and-subscribe server to publish anonymous context information, in accordance with various embodiments.

An example P&S exchange 400 is depicted in FIG. 4. In this example, CIM 110 may provide anonymous context information first to P&S server 316. P&S server 316 in turn may broadcast the anonymous context information to other entities. In other embodiments, CIM 110 may directly broadcast anonymous context information. However, a direct broadcast by CIM 110 may pose a higher risk that identification of the user will be enabled (e.g., via an IP address or other identifying information that may be incorporated into such a broadcast without the user's knowledge). Broadcasting anonymous context information through P&S server 316, on the other hand, may add a layer of concealment and reduce the likelihood that disclosure will enable user identification.

At arrow 402, CIM 110 may register, e.g., with P&S server 316, to publish anonymous context information including one or more dimension attributes. At arrow 404, P&S server 316 may provide, e.g., to CIM 110, a "signature revocation list," or "SigRL." A SigRL may be used by CIM 110 to prove to P&S server 316 that consumer device 102 is legitimate (e.g., has not been compromised by a man-in-the-middle attack) while maintaining anonymity of the user. At arrow 406, CIM 110 may provide, e.g., to P&S server 316, signed dimension data. In some embodiments, the dimension data may be signed with a dimension key. In some embodiments, the dimension data may be signed with an EPID private key. At arrow 408, P&S server 316 may broadcast the signed dimension attributes to publishers such as vendors 106.

As noted above, CIM 110 may authenticate consumer device 102 to dimension authority 120. Various types of authentication and/or verification protocols may be used to facilitate secure exchange of potential dimensions between consumer device 102 and dimension authority. In various embodiments, these protocols may be used to prevent, among other things, man-in-the-middle attacks.

Figure 5:
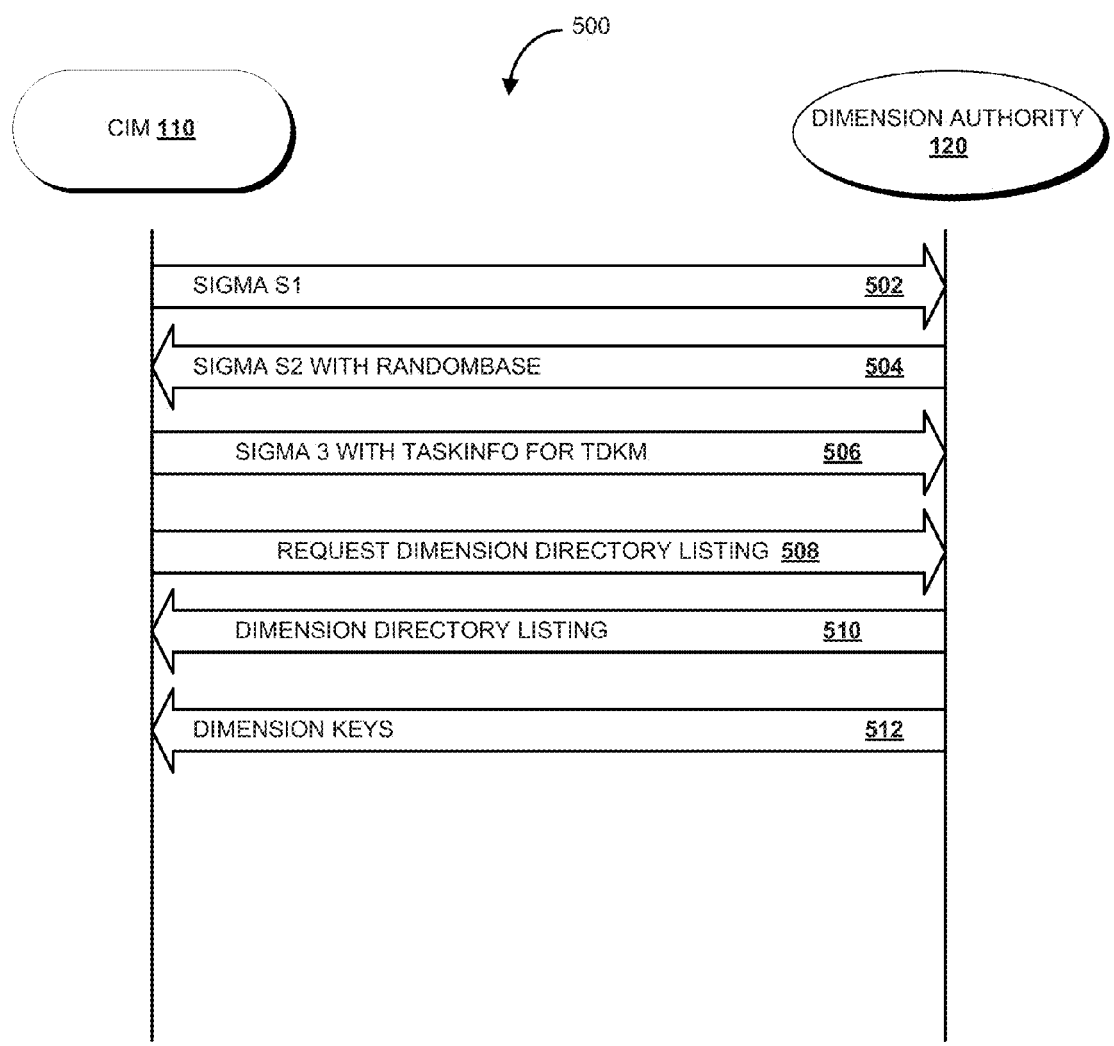
FIG. 5 schematically illustrates an example authentication and dimension provision session between a consumer device and a dimension authority, in accordance with various embodiments.

One example exchange 500 that may be implemented between CIM 110 and dimension authority 120 to facilitate secure provision of dimension keys is depicted in FIG. 5. This is an example of what is known as a "SIGn and MAc," or "SIGMA," exchange in which the client endpoint terminates in TEE 112. In various embodiments, exchange 500 may be implemented using a signed Diffie-Hellman protocol. In other embodiments, other exchange protocols may be used.

At arrow 502, CIM 110 may provide, e.g., to dimension authority 120, a SIGMA S1 message. In various embodiments, the SIGMA S1 message may be signed, e.g., by consumer device 102, using its EPID private key. For example, in various embodiments, CIM 110, acting as a "prover," may choose a random value, a, as its ephemeral Diffie-Hellman ("DH") key. CIM 110 may then compute $g^a$ as its ephemeral DH public key. CIM 110 may send a Group ID of its current EPID key and $g^a$ to the verifier, which in this example is dimension authority 120. In various embodiments, CIM 110 may also append an Online Certificate Status Protocol ("OCSP") Request.

At arrow 504, dimension authority 120 may provide, e.g., to CIM 110, a SIGMA S2 message that may be generated using a random-base identifier. For example, in various embodiments, dimension authority 120 may generate and transmit a SIGMA S2 message in accordance with the following:

1) dimension authority 120 may select a random value, b, as its ephemeral DH private key
2) dimension authority 120 may compute $g^b$ as its ephemeral DH public key.
3) dimension authority 120 may compute $g^{ab}=(g^a)^b$
4) dimension authority 120 may derive a secrecy MACing key ("SMK"), a secrecy key ("SK"), and a MACing key ("MK").

5) dimension authority 120 may then determine a SIG-RL corresponding to the Group ID of CIM 110.
6) dimension authority 120 may select a basename for the protocol, or it may set the basename to 0x00 for random based signatures.
7) dimension authority 120 may compute the MAC of SIG-RL, basename, OCSPReq, OCSP response(s), and Cert$_{ver}$ using the SMK.
8) dimension authority 120 may sign ($g^a \| g^b$) using its signing key to produce Sig($g^a \| g^b$)
9) dimension authority 120 may request n OCSP Responses from one or more OCSP responder servers, e.g., using a OCSP nonce exchanged in the S1 message. In some cases, n may be the number of certificates in dimension authority's certification chain. In some cases, the n OCSP responses may cover the n certificates in the Verifier certificate chain. In various embodiments, dimension authority 120 may wait for an OCSP response from CIM 110, and may verify the response upon receipt.
10) dimension authority 120 may send to CIM 110 the following: [$g^b$, BaseName, OCSPReq, Cert$_{ver}$, SIG-RL, OCSPResp]$_{SMK}$, and Sig($g^a \| g^b$).

In various embodiments, CIM 110 may verify the received SIGMA S2 message. In some embodiments, CIM 110 may verify this data using steps similar to the following:
1) CIM 110 may compute $g^{ab} = (g^b)^a$
2) CIM 110 may derive SMK, SK and MK as described above
3) CIM 110 may verify the 1$^{st}$ certificate in the Cert$_{ver}$ chain using, e.g., an Intel Verification Key ("IVK") installed during manufacturing, e.g., by the Intel Corporation of Santa Clara, Calif.
4) CIM 110 may verify the MAC of BaseName, OCSPReq, Cert$_{ver}$, SIG-RL, and OCSP response (if any) using SMK.
5) CIM 110 may verify the n OCSP Responses (if needed).
   a) If CIM 110 is using the OCSP response for provisioning trusted time, the response may be non-cached and returned within, e.g., two minutes of sending the S1 message. If there are multiple OCSP responses, a ProducedAt time stamp of the first OCSP response received by CIM 110 may be used as trusted time.
   b) If CIM 110 is accepting non-cached responses, the timestamp in the response may be less than, e.g., one day old.
6) CIM 110 may verify the signature of ($g^a \| g^b$) using the verifier's public key in Cert$_{ver}$.

After verifying the dimension authority certificate, at arrow 506, CIM 110 may generate and provide, e.g., to dimension authority 120, a SIGMA 3 message. In various embodiments, the SIGMA S3 message may include information describing a software and/or hardware configuration of TEE 112, including in some cases the ability of TEE 112 to support dimension provisioning. For example, in various embodiments, CIM 110 may generate and provide, e.g., to dimension authority 120, the SIGMA S3 message in accordance with the following:
1) CIM 110 may compute a MAC of the entire S3 message using SMK, e.g., to produce [TaskInfo$\|g^a\|$E-PIDCert$_{prvr}\|$EPIDSig($g^a\|g^b$)]$_{SMK}$.
2) CIM 110 may use its current EPID key and BaseName to sign ($g^a\|g^b$), e.g., to produce EPID-Sig($g^a\|g^b$). The EPID signature may include the non-revoked proofs based on SIG-RL.
3) CIM 110 may send [TaskInfo$\|g^a\|$EPIDCert$_{prvr}\|$EPID-Sig($g^a\|g^b$)]$_{SMK}$ to dimension authority 120.

In various embodiments, dimension authority 120 may use the SIGMA S3 message to determine whether CIM 110 is capable of protecting dimensions. For example, in various embodiments, dimension authority 120 may verify the SIGMA S3 message in accordance with the following:
1) dimension authority 120 may verify [TaskInfo$\|g^a\|$E-PIDCert$_{prvr}\|$EPIDSig($g^a\|g^b$)]$_{SMK}$ using SMK.
2) dimension authority 120 may verify $g^a$ is the same that arrived in the SIGMA S1 message.
3) dimension authority 120 may verify the EPID group certificate Cert$_{prvr}$ using IVK.
4) dimension authority 120 may verify the EPID signature of ($g^a\|g^b$), including the revocation check.
5) dimension authority 120 may verify the TaskInfo structure which may not be required for all verifiers At arrow 508, CIM 110 may request, e.g., from dimension authority 120, a dimension directory listing. At block 510, dimension authority 120 may provide, e.g., to CIM 110, the requested dimension directory listing. At arrow 512, CIM 110 may provide, e.g., to dimension authority 120, one or more selected dimensions, e.g., to which consumer device 102 may subscribe. The subscribed dimensions may be associated with (e.g., signed by) the EPID, rather than with consumer device 102 or its user. In this way, dimension authority 120 may be able to tally a new member of a particular dimension (e.g., by adding one to the population count) without knowing an identity of the user.

In some embodiments, upon receiving a selection of a dimension for subscription from CIM 110, dimension authority 120 may automatically subscribe consumer device 102 to an administrative broadcast channel on which data representative of changes in population counts of attributes may be broadcast. In some embodiments, subscription to the administrative broadcast channel may occur over a privacy-enhanced IP network in which the IP address for a subscribing device is selected at random from a list of reusable addresses or otherwise randomly determined. The subscribing device may periodically re-subscribe using a different IP address to reduce the likelihood that dimension authority 120 is able to track specific subscribers. The frequency of re-subscription may be adjusted by CIM 110 (e.g., in accordance with a desired level of privacy or in response to a particular level of risk). In some embodiments, subscription logic 1014 (FIG. 10, discussed below) may perform the automatic subscription. In embodiments in which users are automatically subscribed to the administrative broadcast channel, subscription to this channel does not help identify the users, and thus may not present an increased privacy risk due to subscription. In some embodiments, each subscriber to the administrative broadcast channel may subscribe to all or most of the dimensions monitored by dimension authority 120, including those in which the subscriber is specifically interested, to ensure that the specific set of dimensions interesting to the subscriber does not serve to identify the subscriber.

At arrow 512, dimension authority 120 may provide, e.g., to CIM 110, dimension keys for the selected dimensions. In some embodiments, dimension authority 120 may generate a separate dimension key, e.g., based on an EPID public key, for each dimension. In some embodiments, dimension authority 120 may generate and provide, e.g., to CIM 110, a separate EPID private key for each subscribed dimension.

These techniques may enable multiple ways to prevent a rogue from propagating false dimensions. For example, if separate EPID private keys are used for each dimension, then even if a rogue obtains an EPID private key for one dimension, that rogue cannot authenticate itself to another dimension. Additionally or alternatively, an EPID key in combination with a dimension basename may be used to prevent similar issues.

Upon completion of the data exchange of FIG. 5, CIM 110 may terminate the SIGMA session. Meanwhile, dimension authority 120 may update a count associated with dimensions to which CIM 110 subscribed, e.g., by incrementing the count by one. In some embodiments, tracking logic 1004 (FIG. 10, discussed below) may track the population count.

In various embodiments, the SIGMA protocol may be used in other scenarios, e.g., when CIM 110 provides signed dimension attributes to P&S server 316. In some such cases, a SIGMA basename may contain a taxonomic dimension attribute path representing the dimension attribute to be disclosed (e.g. "vehicle→pickup→extended cab"). Rather than signing with a dimension key specific to the most granular dimension attribute of the path (e.g., "extended cab"), CIM may sign with a parent dimension (e.g., vehicle) key.

Referring back to FIG. 3, CIM 110 may provide signed dimension attributes to consumer application 105. Consumer application 105 may in turn provide the signed dimension attributes to other entities, such as vendors 106 and/or P&S server 316. In some embodiments where consumer application 105 broadcasts signed dimension attributes using P&S server 316, as shown in FIG. 3, CIM 110 may digitally sign the dimension attributes using an EPID-named base. In embodiments where consumer application 105 broadcasts signed dimension data using a multicast network, CIM 110 may digitally sign dimension data using an EPID for the specified dimension. Signing dimensions in this manner may enable entities such as P&S server 316 to track dimension disclosure statistics, without enabling user identification.

P&S server 316 may broadcast signed dimension attributes to entities such as vendor 106. In various embodiments, vendor 106 may verify anonymous context information received from consumer devices 102. For instance, vendor 106 may verify one or more signed dimensions using an EPID public key or dimension keys obtained from dimension authority 120, e.g., via a trust anchor provisioning scheme. If vendor 106 determines that a signed dimension attribute received from consumer device 102 is not authentic, that may indicate a possible misuse of a dimension key. In such case, vendor 106 may notify dimension authority 120. However, if vendor 106 successfully verifies the authenticity of the signed dimension attributes, then vendor 106 may process the dimension for use in E-commerce, e.g., by generating or requesting content targeted towards the verified dimension.

Figure 6:
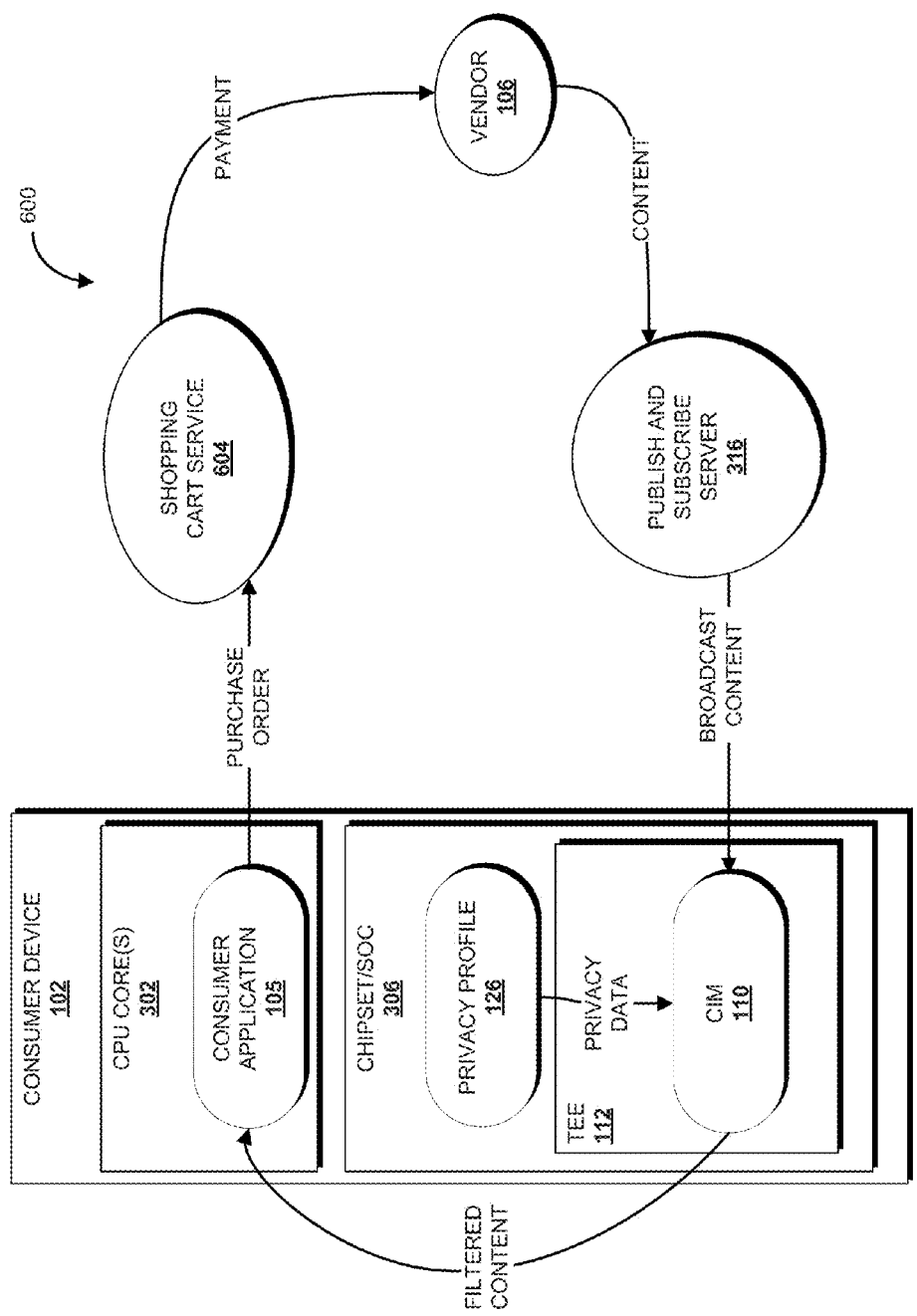
FIG. 6 schematically illustrates another example E-commerce exchange, in accordance with various embodiments.

FIG. 6 depicts an example scenario 600 in which P&S server 316 and other entities may facilitate generation and provision of targeted content to consumer device 102. Vendor 106 may generate content (e.g., advertisements, offers, coupons) that is targeted towards various dimension attributes or combinations of dimension attributes. In various embodiments, vendor 106 may publish the targeted content to a particular subscriber class, associated with one or more dimensions, that is maintained by P&S server 316. P&S server 316 may in turn broadcast the targeted content to consumer devices 102 subscribed to that particular class. This may avoid a requirement of user authentication as a prerequisite to receiving targeted content.

In various embodiments, vendor 106 may be configured to generate content that targets a temporary dimension attribute of consumer device 102 or its user. For instance, vendor 106 may target a first offer containing a small discount to a dimension channel of P&S server 316 subscribed to by consumer devices 102 that are at least a predetermined distance from a brick-and-mortar location of vendor 106 (e.g., as measured by a GPS). Vendor 106 may target a second offer containing a steeper discount to a dimension channel of P&S server 316 subscribed to by consumer devices 102 that are less than the predetermined distance from a brick-and-mortar location of vendor 106. The steeper discount may entice undecided consumers already near a brick-and-mortar location to enter and redeem the second offer. As another example, a food vendor 106 may target an offer with a discount to a P&S server dimension channel subscribed to by users whose online calendars reveal they have not eaten for more than a predetermined time interval.

In various embodiments, CIM 110 may be configured to filter broadcasted content received from P&S server 316, e.g., as depicted at block 226 of FIG. 2. Unwanted content (e.g., spam) may be filtered out, e.g., by CIM 110 based on privacy profile 126, user or consumer device attributes, and so forth, so that only content that satisfies the user's privacy profile 126 is presented to the user for consumption. For instance, assume consumer device discloses a dimension attribute, "last meal," that occurred seven hours ago. The user's consumer device 102 may receive the offer from the aforementioned food vendor 106. However, CIM 110 may determine, e.g., based on user-configured settings, past purchase history, or current dimension attribute measures (e.g., the user has a dimension attribute <location, "Sal's Diner">), that the user is not interested in food offers. In such case, CIM 110 may discard the received offer as spam.

In various embodiments, CIM 110 may be configured to examine the privacy implications of engagement of a particular targeted content and make a suitable recommendation to the user, e.g., as depicted in blocks 228-234 of FIG. 2. For instance, assume a particular targeted content offers a product X for a 40% discount to users having the following three dimension attributes: A={affiliates of a particular group}; B={older than a particular age}; and C={located in a particular state}. CIM 110 may analyze the dimensions containing these attributes and associated counts to determine the likelihood that membership in an intersection of these dimension attributes (e.g., A∩B∩C) will enable identification of the user. If the likelihood is too high (e.g., higher than an anonymity threshold set forth in threshold database 118), then CIM 110 may prevent or discourage the user from engaging the targeted content (e.g., block 230 of FIG. 2), in spite of the fact that the user may have to pay more for the same product. Otherwise, CIM 110 may notify the user that engagement of the targeted content is "safe," e.g., as depicted at block 234 of FIG. 2.

Referring back to FIG. 6, the user may engage the targeted content by operating consumer application 105 to submit a purchase order to, e.g., a shopping cart service 604. Shopping cart service 604 may be configured to operate as a "middleman" for one or more vendors 106. In various embodiments, shopping cart service 604 may provide payment to vendor 106. In other embodiments, vendor 106 itself may operate an internal shopping cart service, forgoing a middleman such as shopping cart service 604. In such case, consumer application 105 may submit a purchase order and/or payment directly to vendor 106. In some such embodiments, consumer device 102 may alter or otherwise obfuscate its IP address, e.g., using randomization or network address translation, to prevent vendor 106 from being able to identify consumer device 102 using its IP address.

In various embodiments, vendor 106 may be configured to "learn" from engaged targeted content. For instance, the more users engage an advertisement targeted towards a particular dimension attribute or combination of dimension attributes, the more confident vendor 106 may be that the selected dimension attribute or combination of dimension attributes is a compelling target. Vendor 106 may further generate and refine targeted content based on subsequent user engagement, so that future users have a more compelling experience, and marketing efforts of vendor 106 are increasingly successful.

Figure 7:
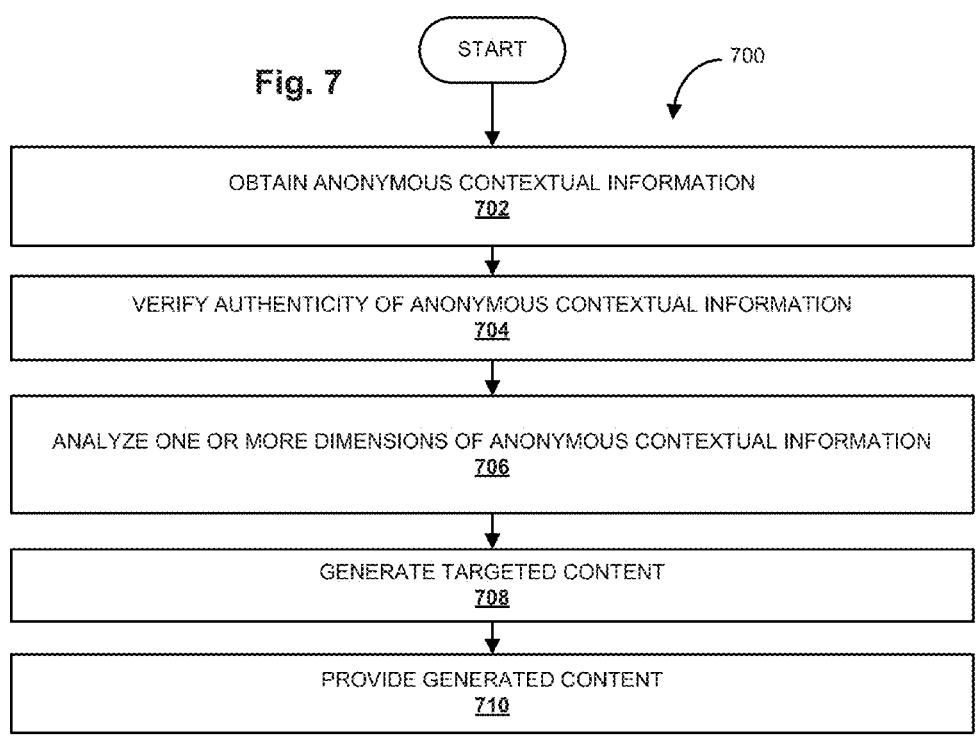
FIG. 7 schematically illustrates an example method that may be implemented by a content generating or providing entity, in accordance with various embodiments.

FIG. 7 depicts an example method 700 that may be implemented in various embodiments by a content generator/provider such as vendor 106, an advertiser (not shown), etc. At block 702, vendor 106 may obtain, e.g., from dimension authority 120 and/or CIM 110, anonymous context information.

At block 704, vendor 106 may verify an authenticity of the anonymous context information, e.g., by verifying a dimension authority domain associated with the data, a dimension name, and/or a dimension key. In some embodiments, EPID signatures may be verified, e.g., by vendor 106, using EPID public keys. In various embodiments, vendor 106 may be configured to securely obtain the public keys from dimension authority 120, e.g., by using various keys such as an X.509 certificate. In other embodiments, vendor 106 may implement a Verifier side of a SIGMA protocol. For example, vendor 106 may verify the dimension names/keys and "b" values from consumer device 102 using the dimension authority's 120 certificate. Vendor 106 may then complete the SIGMA session for the signed dimension data received from P&S server 316 (or multi-cast router). Because "b" may be shared among vendors 106, SIGMA session keys may be the same for each vendor 106. This may alleviate the need for consumer device 102 to manage pair-wise session keys for each vendor 106.

At block 706, vendor 106 may analyze one or more dimension attributes of the anonymous context information. In various embodiments, vendor 106 may hypothesize which combination of dimension attributes may be compelling, either to a user who provided the anonymous context information or other users. For example, vendor 106 may identify a demographic that includes some or all of the dimension attributes of the anonymous context information.

This hypothesis may be based on other information as well. For example, dimension authority 120 may not be aware of which specific users or computing environments have which particular attributes, and therefore may not be able to determine a population count of users or computing environments sharing two different attributes. Thus, in various embodiments, dimension authority 120 may be configured to estimate a population count of a union between users or computing environments sharing a first dimension attribute and users or computing environments sharing a second dimension attribute. In various embodiments, this estimation may be based on a collected data sample obtained, e.g., via a survey targeted to a focus group.

At block 708, vendor 106 may generate targeted content (e.g., advertisement, coupon, offer, etc.), e.g., based on the analysis. At block 710, vendor 106 may broadcast the generated content to consumer devices 102 of potentially interested users. For example, vendor 106 may provide the content to P&S server 316. P&S server 316 may then provide the targeted content to consumer devices 102 subscribed to a channel corresponding to the hypothesized dimension attribute.

Figure 8:
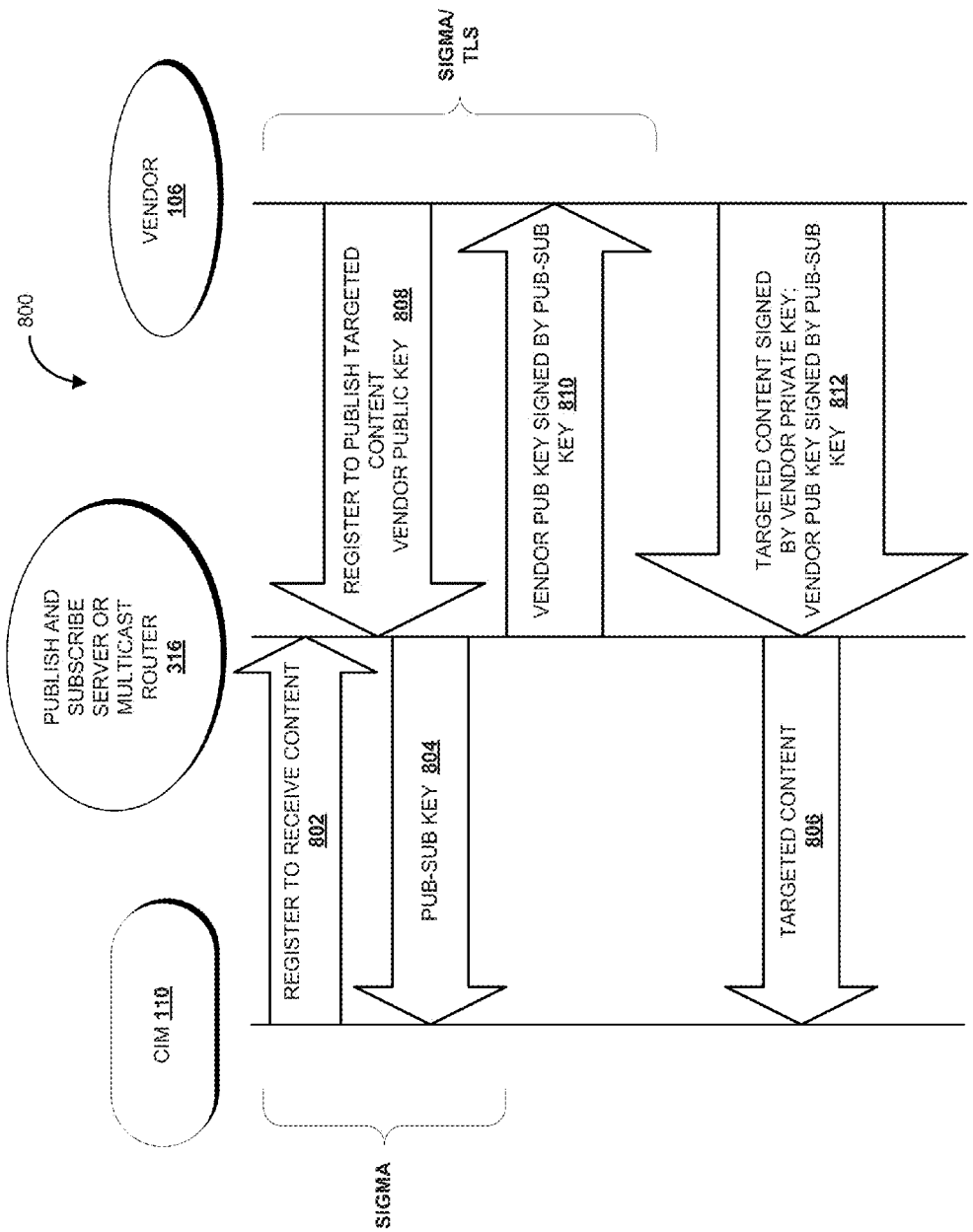
FIG. 8 schematically illustrates another example publish-and-subscribe exchange in which a consumer device subscribes to a channel, and a content provider registers to publish to the channel, in accordance with various embodiments.

FIG. 8 depicts an example of how CIM 110 and content-generating or content-providing entities such as vendor 106 may register with P&S server 316 to facilitate E-commerce exchanges like the one depicted in FIG. 6, and operation of method 700 of FIG. 7. At arrow 802, CIM 110 may register, e.g., with P&S server 316, to receive targeted content, e.g., by providing anonymous context information. In various embodiments, CIM 110 may first determine that a likelihood that disclosure of the anonymous context information will enable user identification does not violate risk tolerance of the user, as shown in FIG. 2 at blocks 210-222. In some embodiments, CIM 110 may initiate a post-publication monitoring process upon disclosure of the anonymous context information to monitor for changes in privacy risk associated with continued publication of the anonymous context information (e.g., as discussed above with reference to FIG. 2 and below with reference to FIGS. 9-12).

At arrow 804, P&S server 316 may provide, e.g., to CIM 110, a P&S key corresponding to a particular P&S channel. In various embodiments, the exchange represented by arrows 802 and 804 may be implemented using a SIGMA exchange similar to the one described above. In various embodiments, the P&S key may be used, e.g., by CIM 110 to verify that vendors 106 are authorized to participate in a market. At arrow 806, the P&S server 316 may provide, e.g., to CIM 110, content targeted towards dimension attributes of the P&S channel.

A similar exchange may occur between a content generating or providing entity such as vendor 106 and P&S server 316. At arrow 808, vendor 106 may register, e.g., with P&S server 316, to publish targeted content, and/or provide a vendor public key. At arrow 810, P&S server 316 may provide, e.g., to vendor 106, the vendor public key signed with the same pub-sub key that was provided to CIM 110 at arrow 806. In various embodiments, the exchange represented by arrows 808 and 810 may be implemented using a SIGMA exchange similar to the one described above, or transport layer security ("TLS," formerly known as secure shell, or "SSH").

At arrow 812, vendor 106 may provide, e.g., to P&S server 316 for distribution to subscribers, content targeted to the P&S channel. In various embodiments, the targeted content may be signed by the vendor's private key, as well as the vendor's public key signed by the pub-sub key. CIM 110 may utilize the pub-sub key (which it received at arrow 806) to verify and/or decrypt the vendor public key. CIM 110 may then use the vendor public key to verify and/or decrypt the targeted content which is signed with the vendor private key. In some embodiments, vendor 106 may inject metadata into the targeted content, e.g., identifying one or more dimensions to which the content is targeted.

As discussed above, CIM 110 may be configured to perform a privacy analysis prior to allowing or recommending the disclosure of an attribute of a user. For example, in some embodiments, CIM 110 may evaluate each dimension of information to be disclosed by a user, determine whether the attribute of that dimension has been previously disclosed, query dimension authority 120 if the attribute has not been disclosed and determine whether the population associated with that dimension is greater than that required by a user's privacy profile 126, and only publish the attribute if the privacy criteria are satisfied. In some embodiments, CIM 110 may be further configured to perform a post-publication monitoring process after an attribute is disclosed. Disclosure of an attribute may include any action taken by the user that may compromise the user's privacy (e.g., engagement with targeted content, as discussed above with reference to FIG. 2).

Figure 9:
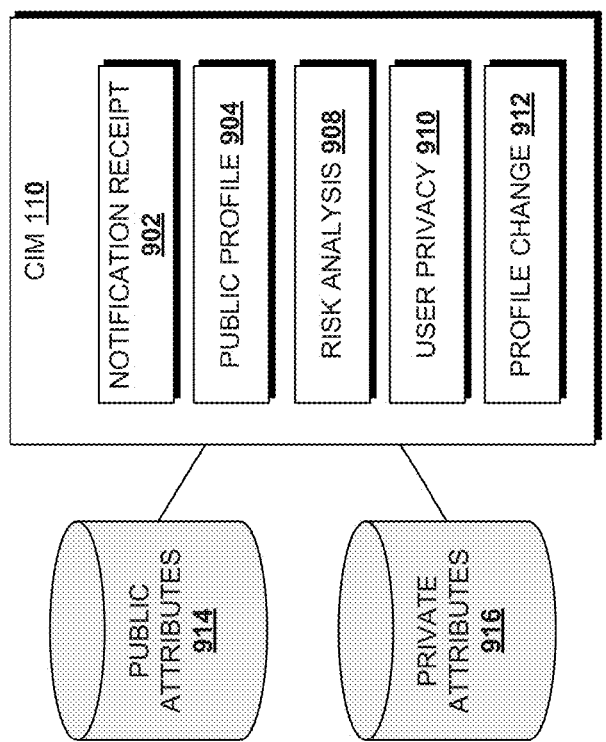
FIG. 9 schematically illustrates an example consumer information manager configured for post-publication monitoring, in accordance with various embodiments.

FIG. 9 schematically illustrates an example CIM configured for post-publication monitoring, in accordance with various embodiments. The CIM of FIG. 9 may be implemented using any suitable device or combination of devices, such as one or more of the computing device 1300 of FIG. 13 (discussed below). Although the CIM of FIG. 9 may be discussed with reference to CIM 110, dimension authority 120 and E-commerce system 100, the CIM of FIG. 9 may perform any one or more of the functions described herein with reference to CIM 110 in any suitable context. For example, the CIM of FIG. 9 may be used in a social media computing system. In some embodiments, CIM 110 may operate entirely within TEE 112; in other embodiments, one or more components of CIM 110 may operate outside of TEE 112.

As discussed above, CIM 110 may be associated with a user of E-commerce system 100, or a user of any other multi-user computing system. As used in the discussion of post-publication monitoring, references to "a user" may also refer to one or more consumer devices associated with the user. The operation of the components of CIM 110 may also be discussed with reference to "an attribute" or "the attribute"; it will be understood that reference to a singular attribute is for clarity of illustration only, and that CIM 110 may perform the described operations with respect to one or more attributes. In addition, CIM 110 may manage attributes individually or jointly (e.g., in pairs, triples, or other combinations) as discussed in detail below.

CIM 110 may include notification receipt logic 902. Notification receipt logic 902 may be configured to receive a notification, from dimension authority 120, of a decrease in a population count of users of the system 100 who have published an attribute within the system 100. In some embodiments, a user has "published" an attribute when the attribute is included in a set of public attributes 914 associated with the user. An attribute may be referred to as "unpublished" when it is removed from the set of public attributes 914 associated with the user. Public attribute set 914 may be stored in a database or any other suitable memory structure accessible by CIM 110. In some embodiments, a user's engagement with targeted content may be treated as a published attribute for the purposes of post-publication monitoring (e.g., as discussed above with reference to block 238 of FIG. 2).

In some embodiments, an attribute included in the set of public attributes 914 associated with the user is available to at least one other entity of system 100 (e.g., another user, a content provider, a vendor, an exchange and/or a dimension authority). In some embodiments, an attribute in the set of public attributes 914 may be accessible by one or more of these entities automatically and/or upon request. In some embodiments, an attribute may be included in the set of public attributes 914 because the user has registered the attribute with a publish-and-subscribe server (e.g., the server 316 of FIG. 3). In some embodiments, an attribute may be registered with a public-and-subscriber server in response to the user designating that attribute for inclusion in the set of public attributes 914.

CIM 110 may include public profile logic 904. Public profile logic 904 may be operatively coupled with notification receipt logic 902, and may be configured to determine whether the user has published the attribute that was the subject of the notification received by notification receipt logic 902 from dimension authority 120.

CIM 110 may include risk analysis logic 908. Risk analysis logic 908 may be operatively coupled with notification receipt logic 902 and public profile logic 904. In some embodiments, risk analysis logic 908 may be configured to determine, in response to the receipt of a notification of a decrease in the population count of users (as received by notification receipt logic 902) and the determination that the user has published the attribute (as made by public profile logic 904), a value representative of a likelihood that continued publication of the attribute will enable identification of the user. Risk analysis logic 908 may make this determination in accordance with any suitable technique, such as any of the techniques disclosed herein. For example, in some embodiments, risk analysis logic 908 may determine (as the value representative of the likelihood) an anonymity index in accordance with Eq. 1. In some embodiments, risk analysis logic 908 may determine (as the value representative of the likelihood) a probability of identification of the user.

CIM 110 may include user privacy logic 910. User privacy logic 910 may be operatively coupled with risk analysis logic 908, and may be configured to compare the likelihood (determined by risk analysis logic 908) to a threshold. The threshold used by user privacy logic 910 may be supplied by privacy manager 124 (e.g., via privacy profile 126) and/or may be stored locally to user privacy logic 910. In some embodiments, the threshold may be based on a risk tolerance associated with the user. The threshold may take the form of any of the anonymity thresholds described herein. For example, user privacy logic 910 may apply different thresholds to attributes published to different entities (e.g., with higher thresholds associated with entities that are more trusted).

CIM 110 may include profile change logic 912. Profile change logic 912 may be operatively coupled with user privacy logic 910 and public profile logic 904, to remove the attribute from the set of public attributes when the likelihood exceeds the threshold (as determined by user privacy logic 910). In some embodiments, profile change logic 912 may be further configured to include the attribute in a set of private attributes 916 associated with the user (before, after, or substantially concurrently with removing the attribute from the set of public attributes 914). Private attribute set 916 may be stored in a database or any other suitable memory structure accessible by CIM 110. 8. In some embodiments, profile change logic 912 may be further configured to unsubscribe the user from a channel associated with the attribute when the value representative of the likelihood exceeds the threshold (e.g., even if subscription to the channel was permitted at the time of subscription).

An attribute included in the set of private attributes 916 may not available to dimension authority 120 and/or other entities in system 100. For example, if a content provider acts as an entity in system 100, and is configured to select content for the user based on at least one attribute of the user, the content provider may have access to some or all of the attributes included in the set of public attributes 914 (and may use these attributes to target content) but may not have access to any of the attributes included in the set of private attributes 916 (unless access is otherwise granted).

In some embodiments, profile change logic 912 may be configured to remove the attribute from the set of public attributes 914 without requiring the user to authorize the removal in the period between the receipt of the notification (e.g., by the notification receipt logic 902) and the removal of the attribute from the set of public attributes 914. In some such embodiments, upon the determination by user privacy logic 910 that the continued publication of the attribute will compromise the user's privacy criteria (as controlled by privacy profile 126, for example), profile change logic 912 may remove the attribute from the set of public attributes 914 and include the attribute in the set of private attributes 916 without user intervention. Removing problematic attributes automatically may minimize the user's exposure time, and may allow the CIM 110 to manage many attributes without overloading the user. In other embodiments, CIM 110 may be configured to request or require user authorization before a published attribute is unpublished.

Whether or not user authorization is requested or required may depend on the particular attribute. For example, if subscription to a valuable news service is dependent upon publication of a user's location, CIM 110 may prompt the user before unpublishing the user's location, even if population changes may render location information personally identifiable. The value of various services in system 100 may be established by the user (e.g., by using a star or point system to indicate how valuable the service is to the particular user), by a monetary value (e.g., the cost of purchasing access to the system without publishing any attributes), the popularity of the service (e.g., as measured by the number of social media or other contacts the user has participating in the service), or any other such indicator. For example, the user may manually indicate (via consumer device 102) which services are valuable enough to warrant pre-authorization of removal of any attribute that would compromise participation in the service.

In some embodiments, one or more of the components of CIM 110 (e.g., notification receipt logic 902, public profile logic 904, risk analysis logic 908, user privacy logic 910 or profile change logic 912) may be configured to provide a message to the user (e.g., via a graphical display) notifying the user of changes in privacy risk (or conditions that may affect such risk) around published attributes. Such a message may be provided before, after, or substantially simultaneously with changes to the set of public attributes 914.

Figure 10:
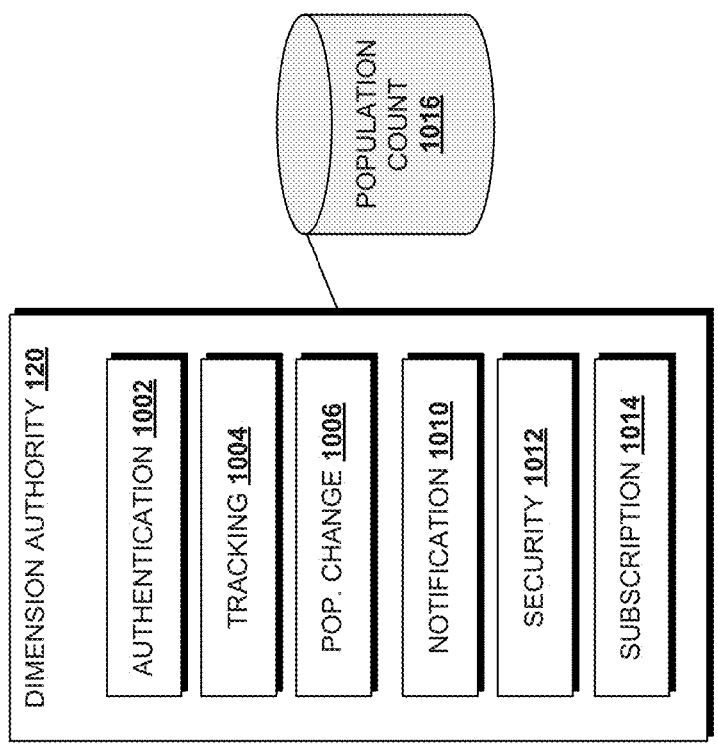
FIG. 10 schematically illustrates an example dimension authority configured for post-publication monitoring, in accordance with various embodiments.

FIG. 10 schematically illustrates an example dimension authority configured for post-publication monitoring, in accordance with various embodiments. The dimension authority of FIG. 10 may be implemented using any suitable device or combination of devices, such as one or more of the computing device 1300 of FIG. 13 (discussed below). Although the dimension authority of FIG. 10 may be discussed with reference to dimension authority 120, CIM 110 and E-commerce system 100, the dimension authority of FIG. 10 may perform any one or more of the functions described herein with reference to dimension authority 120 in any suitable context. For example, the dimension authority of FIG. 10 may be used in a social media computing system, or any other multi-user computing system.

The operation of the components of dimension authority 120 may also be discussed with reference to "an attribute" or "the attribute"; it will be understood that reference to a singular attribute is for clarity of illustration only, and that dimension authority 120 may perform the described operations with respect to one or more attributes. An attribute may take any of the forms discussed herein with respect to attributes and dimensions. For example, an attribute tracked by dimension authority 120 may include an affinity associated with a user, demographic information about a user, and/or activity history of a user. In some embodiments, a user's engagement with targeted content may be treated as a published attribute for the purposes of post-publication monitoring (e.g., as discussed above with reference to block 238 of FIG. 2).

Dimension authority 120 may include tracking logic 1004. Tracking logic 1004 may be configured to track a population count of users of system 100 who have published an attribute within system 100. As discussed above, in some embodiments, publication of an attribute within system 100 may occur upon a user's registration of the attribute with a publish-and-subscribe server (e.g., server 316 of FIG. 3). The population count of one or more attributes may be stored in population count storage 1016, which may include a database or any other suitable memory structure accessible by dimension authority 120. Dimension authority 120 may receive data representative of population counts from any of a number of sources. For example, as discussed above, dimension authority 120 may receive, e.g., from exchange node 104 or vendor 106, an ontology specification including one or more potential dimension attributes of computing environments or users to be tracked.

Dimension authority 120 may include population change logic 1006. Population change logic 1006 may be operatively coupled with tracking logic 1002, and may be configured to determine when the population count has decreased by a threshold amount. In some embodiments, the threshold amount may be any amount; in such embodiments, dimension authority 120 may identify any decrease in the population count associated with an attribute. In some embodiments, the threshold amount may be an absolute number of users (e.g., a decrease of 100 users), a percentage (e.g., a decrease of 10% of the existing population), or a decrease below a particular value (e.g., any decrease that brings the population below 500 users). In some embodiments, the threshold amount may be a function of time. For example, population change logic 120 may determine that the population count has decreased by a threshold amount when the population count has decreased by a threshold amount in a particular period of time, representing a rate of change of decrease (e.g., a decrease of 50 users in one hour). In some embodiments, the threshold amount may represent an acceleration of decrease (e.g., a decrease accelerating at 10 users per minute).

Dimension authority 120 may include notification logic 1010. Notification logic 1010 may be operatively coupled with population change logic 1006. Notification logic 1010 may be configured to provide data representative of the population count to the users of system 100 in response to a determination that the population count has decreased by the threshold amount (e.g., as made by population change logic 1006). The data representative of the population count may include the population count itself, data representative of a change in population count (e.g., a number of users, a percentage decrease, etc.), a signed value (e.g., a plus or minus, indicating an increase or decrease in the population count, respectively), or any other data that may be used to reevaluate privacy risk.

In some embodiments, notification logic 1010 is to provide the population count to a CIM (e.g., CIM 110). The CIM may operate on behalf of a user, and the population count provided by notification logic 1010 may enable the CIM to remove the attribute from a set of public attributes (e.g., the set of public attributes 914) associated with the user. As discussed above with reference to FIG. 9, a CIM may remove an attribute from the set of public attributes 914 in response to receiving the population count from dimension authority 120 and determining that continued publication violates a privacy criteria (e.g., when the likelihood of identifying the user as a result of continued publication exceeds a tolerable level).

In some embodiments, notification logic 1010 may provide the data representative of the population count to the users by providing a broadcast message containing the data representative of the population count to an administrative broadcast channel subscribed to by the users. In some such embodiments, all users who have published an attribute within system 100 may be automatically subscribed to the administrative broadcast channel. Subscription to the administrative broadcast channel may take any of a number of forms, such as those described above.

Dimension authority 120 may include authentication logic 1002. Authentication logic 1002 may be operatively coupled with tracking logic 1004, and may authenticate data received by dimension authority 120 to be used in determining the population count for a particular attribute.

Dimension authority 120 may include security logic 1012. Security logic 1012 may be operatively coupled with notification logic 1010, and may be configured to provide a key, corresponding to the attribute, for use by the users in authenticating the data representative of the population count provided by notification logic 1010. In some embodiments, the key provided by security logic 1012 may take the form of any of the embodiments of a dimension key.

Dimension authority 120 may include subscription logic 1014. Subscription logic 1014 may be operatively coupled with notification logic 1010, and may be configured to automatically subscribe all users who have published an attribute within system 100 to the administrative broadcast channel.

FIG. 11 schematically illustrates an example method 1100 for post-publication monitoring, which may be implemented by a consumer information manager, in accordance with various embodiments. It may be recognized that, while the operations of the method 1100 (and any of the methods disclosed herein) are arranged in a particular order and illustrated once each, in various embodiments, one or more of the operations may be repeated, omitted or performed out of order. For illustrative purposes, operations of the method 1100 may be described as performed by CIM 110 with respect to an arbitrary attribute "X" (in communication with dimension authority 120 and system 100), but the method 1100 may be performed by any suitably configured device (e.g., a programmed processing system, an ASIC, or another wireless computing device). Any of the operations of the method 1100 may be performed in accordance with any of the embodiments of the system 100 described herein.

At block 1102, CIM 110 may determine whether CIM 110 is listening for updates from dimension authority 120. If CIM 110 determines at block 1102 that it is not yet listening for updates from dimension authority 120, CIM 110 may proceed to block 1104 and start a listener process for receiving updates from dimension authority 120. A listener process may include CIM 110 listening for updates from dimension authority 120 over a listening channel (e.g., an administrative broadcast channel). The listening phase of a listener process may have a long duration or a short duration. Short duration listener processes may be referred to as "polling" or "long polling" processes. In some embodiments, CIM 110 may restart the listener processes started at block 1104 if CIM 110 receives indicia or otherwise determines that information exchanged over the listening channel may be used by dimension authority 120 or some other device to diminish the anonymity of the device or user associated with CIM 110.

If CIM determines at block 1102 that it is listening for updates from dimension authority 120, CIM 110 may proceed to block 1106 and determine (e.g., via notification receipt logic 902) whether a notification has been received indicating a decrease in a population count of users in system 100 who have published attribute X. If CIM 110 determines at block 1106 that no such notification has been received, CIM 110 may return to block 1106, continue with the listening process and monitor for updates from dimension authority 120.

If CIM 110 determines at block 1106 that a notification has been received for attribute X, CIM 110 may proceed to block 1108 and determine (e.g., using public profile logic 904) whether the user associated with CIM 110 has published attribute X. For example, CIM 110 may execute the operations of block 1108 by determining whether attribute X is included in the set of public attributes 914. If CIM 110 determines at block 1108 that the user has not published attribute X, CIM 110 may return to block 1106, continue with the listening process and monitor for updates from dimension authority 120.

If CIM determines at block 1108 that the user has published attribute X, CIM 110 may proceed to block 1110 and determine (e.g., using risk analysis logic 908) a value representative of a likelihood that continued publication of attribute X will allow the user to be identified. In some embodiments, the value determined at block 1110 may include an anonymity index.

At block 1112, CIM 110 may compare (e.g., using user privacy logic 910) the value determined at block 1110 to a threshold. The threshold may be an anonymity threshold, or any other suitable threshold disclosed herein. In particular, at block 1112, CIM 110 may determine whether the value representative of the likelihood is greater than the threshold. If CIM 110 determines at block 1112 that the value representative of the likelihood is not greater than the threshold, CIM 110 may return to block 1106, continue with the listening process and monitor for updates from dimension authority 120.

If CIM 110 determines at block 1112 that the value representative of the likelihood is less than the threshold (e.g., an anonymity threshold), CIM 110 may proceed to block 1114 and remove attribute X from the set of public attributes associated with the user (e.g., the set of public attributes 914). At block 1116, CIM 110 may include attribute X in a set of private attributes associated with the user (e.g., the set of private attributes 916). CIM 110 may return to block 1106 and continue with the listening process and monitor for updates from dimension authority 120.

FIG. 12 schematically illustrates an example method 1200 for post-publication monitoring, which may be implemented by a dimension authority, in accordance with various embodiments. For illustrative purposes, operations of the method 1200 may be described as performed by dimension authority 120 with respect to an arbitrary attribute "X" (in communication with CIM 110 and system 100), but the method 1200 may be performed by any suitably configured device (e.g., a programmed processing system, an ASIC, or another wireless computing device). Any of the operations of the method 1200 may be performed in accordance with any of the embodiments of the system 100 described herein.

At block 1202, dimension authority 120 may subscribe the user to an administrative broadcast channel (using, e.g., subscription logic 1014). Subscription logic 1014 may initiate the subscription with a publish-and-subscribe server upon the user's publication of the attribute, without requiring any user intervention. In some embodiments, a user who publishes an attribute may not opt out of subscription to the administrative broadcast channel.

At block 1204, dimension authority 120 may receive data that may be used (e.g., by tracking logic 1004) to determine the population count of users who have published attribute X. This data may be received from any of the users and other entities in system 100, as described herein.

At block 1206, dimension authority 120 may authenticate the data received at block 1204 (e.g., using authentication logic 1002). The authentication at block 1206 may take the form of any of suitable authentication technique, such as those disclosed herein.

At block 1208, dimension authority 120 may track (e.g., using tracking logic 1004) the population count of users of system 100 who have published attribute X. In some embodiments, dimension authority 120 may only use authenticated data in tracking the population count at block 1208.

At block 1210, dimension authority 120 may determine (e.g., using population change logic 1006) whether the population count of attribute X has decreased by a threshold amount. In some embodiments, the determination made at block 1210 may take the form of any of the embodiments described above with reference to population change logic 1006 of FIG. 10. If dimension authority 120 determines at block 1210 that the population count of attribute X has not decreased by a threshold amount, dimension authority 120 may return to block 1208 and continue to track the population count of attribute X.

If dimension authority 120 determines at block 1210 that the population count of attribute X has decreased by a threshold amount, dimension authority 120 may proceed to block 1212 and provide data representative of the population count of attribute X to users of system 100 (e.g., using notification logic 1010). In some embodiments, notification logic 1010 may provide the data representative of the population count to the users by providing a broadcast message containing the data representative of the population count to an administrative broadcast channel subscribed to by the users, as discussed above.

At block 1214, dimension authority 120 (e.g., security logic 1012) may provide a key (e.g., a dimension key), corresponding to the attribute, for use by the users in authenticating the data representative of the population count provided at block 1212. Dimension authority 120 may then return to block 1208 and continue to track the population count of attribute X.

In some embodiments, CIM 110 and/or dimension authority 120 may be configured to perform a post-publication monitoring technique, as discussed herein, with respect to pairs, triples, and other combinations of attributes. For example, a user may initially safely disclose that she has "red hair" and "bad eyesight," but if a cure for bad eyesight in red-headed people is developed, that combination of traits may become very rare, even if neither trait individually becomes rare. Dimension authority 120 may be configured to provide data representative of population counts of single attributes, pairs of attributes, triples of attributes, and any other desired combination of attributes, and CIM 110 may be configured to evaluate such population counts when determining whether one or more attributes should be unpublished. In some embodiments, dimension authority 120 and/or CIM 110 may analyze these higher-order combinations in a recursive manner.

FIG. 13 illustrates an example computing device 1300, in accordance with various embodiments. Consumer device 102 or another network entity (e.g., 104, 106, 108, 110, 120, and 316) as described herein, as well as all or part of a computing environment, may be implemented on a computing device such as computing device 1300. Computing device 1300 may include a number of components, one or more processor(s) 1304 and at least one communication chip 1306. In various embodiments, the one or more processor(s) 1304 each may be a processor core. In various embodiments, the at least one communication chip 1306 may also be physically and electrically coupled to the one or more processors 1304. In further implementations, the communication chip 1306 may be part of the one or more processors 1304. In various embodiments, computing device 1300 may include printed circuit board ("PCB") 1302. For these embodiments, the one or more processors 1304 and communication chip 1306 may be disposed thereon. In alternate embodiments, the various components may be coupled without the employment of PCB 1302.

Depending on its applications, computing device 1300 may include other components that may or may not be physically and electrically coupled to the PCB 1302. These other components include, but are not limited to, volatile memory (e.g., dynamic random access memory 1308, also referred to as "DRAM"), non-volatile memory (e.g., read only memory 1310, also referred to as "ROM"), flash memory 1312, an input/output controller 1314, a digital signal processor (not shown), a crypto processor (not shown), a graphics processor 1316, one or more antenna 1318, a display (not shown), a touch screen display 1320, a touch screen controller 1322, a battery 1324, an audio codec (not shown), a video codec (not shown), a global positioning system ("GPS") device 1328, a thermometer (not shown), a Geiger counter (not shown), a compass 1330, a barometer 1332, a camera 1334, and a mass storage device (such as hard disk drive, a solid state drive, compact disk ("CD"), digital versatile disk ("DVD")) (not shown), an accelerometer 1336, a gyroscope 1338, and so forth. In various embodiments, the processor 1304 may be integrated on the same die with other components to form an SoC.

In various embodiments, computing device 1300 may include or may be configured to read computer-readable media having instructions thereon that, when executed by one or more processing devices of computing device 1300, cause computing device 1300 to perform one or more of the operations disclosed herein. For example, volatile memory (e.g., DRAM 1308), non-volatile memory (e.g., ROM 1310), flash memory 1312, and the mass storage device may include programming instructions configured to enable computing device 1300, in response to execution by one or more processors 1304, to practice all or selected aspects of methods and/or data exchanges 200, 400, 500, 700 or 800, depending on whether computing device 1300 is used to implement consumer device 102, dimension authority 120, P&S server 316, vendor 106, or other entities described herein. More specifically, one or more of the memory components such as volatile memory (e.g., DRAM 1308), non-volatile memory (e.g., ROM 1310), flash memory 1312, and the mass storage device may include temporal and/or persistent copies of instructions that, when executed, by one or more processors 1304, enable computing device 1300 to operate one or more modules 1340 configured to practice all or selected aspects of methods and/or data exchanges 200, 400, 500, 700, 800, 1100, or 1200, depending on whether computing device 1300 is used to implement consumer device 102, dimension authority 120, P&S server 316, vendor 106, or other entities described herein. In various embodiments, one or more processors 1304, together with portions of volatile memory (e.g., DRAM 1308), non-volatile memory (e.g., ROM 1310), and/or flash memory 1312 may be configured to provide a secure partition for the earlier described trusted execution environment 112.

The communication chips 1306 may enable wired and/or wireless communications for the transfer of data to and from the computing device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1306 may implement any of a number of wireless standards or protocols, including but not limited to IEEE 902.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 1300 may include a plurality of communication chips 1306. For instance, a first communication chip 1306 may be dedicated to shorter range wireless communications such as Wi-Fi and Bluetooth and a second communication chip 1306 may be dedicated to longer range wireless communications such as GPS, EDGE, GPRS, CDMA, WiMAX, LTE, Ev-DO, and others.

In various implementations, the computing device 1300 may be a laptop, a netbook, a notebook, an Ultrabook™, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 1300 may be any other electronic device that processes data.

The following paragraphs describe various examples of the embodiments disclosed herein. Example 1 is a consumer information management device associated with a user of a multi-user computing system, including: notification receipt logic to receive a notification, from a dimension authority device, of a decrease in a population count of users of the computing system who have published an attribute within the computing system, wherein a user has published an attribute when the attribute is included in a set of public attributes associated with the user; public profile logic, operatively coupled with the notification receipt logic, to determine whether the user has published the attribute; risk analysis logic, operatively coupled with the notification receipt logic and the public profile logic, to, in response to the receipt of a notification of a decrease in the population count of users and the determination that the user has published the attribute, determine a value representative of a likelihood that continued publication of the attribute will enable identification of the user; user privacy logic, operatively coupled with the risk analysis logic, to compare the value representative of the likelihood to a threshold; and profile change logic, operatively coupled with the user privacy logic and the public profile logic, to, when the value representative of the likelihood exceeds the threshold, remove the attribute from the set of public attributes.

Example 2 may include the subject matter of Example 1, and may specify that the profile change logic is further to include the attribute in a set of private attributes associated with the user, wherein an attribute included in the set of private attributes is not available to the dimension authority device.

Example 3 may include the subject matter of any of Examples 1-2, and may specify that the computing system is a social media computing system.

Example 4 may include the subject matter of any of Examples 1-3, and may specify that an attribute included in the set of public attributes associated with the user is available to at least one other entity of the computing system.

Example 5 may include the subject matter of any of Examples 1-4, and may specify that the at least one other entity includes a content provider, the content provider to select content for the user based on at least one of the attributes in the set of public attributes associated with the user.

Example 6 may include the subject matter of any of Examples 1-5, and may specify that the profile change logic is to remove the attribute from the set of public attributes without requiring the user to authorize the removal in the period between the receipt of the notification and the removal of the attribute.

Example 7 may include the subject matter of any of Examples 1-6, and may specify that the threshold is based on a risk tolerance associated with the user.

Example 8 may include the subject matter of any of Examples 1-7, and may specify that the profile change logic is further to unsubscribe the user from a channel associated with the attribute when the value representative of the likelihood exceeds the threshold.

Example 9 is a dimension authority device associated with a multi-user computing system, including: tracking logic to track a population count of users of the computing system who have published an attribute within the computing system; population change logic, operatively coupled with the tracking logic, to determine when the population count has decreased by a threshold amount; and notification logic, operatively coupled with the population change logic, to, in response to the determination that the population count has decreased by the threshold amount, provide data representative of the population count to the users of the computing system.

Example 10 may include the subject matter of Example 9, and may specify that provide data representative of the population count includes provide data representative of the population count to a consumer information management device that operates on behalf of a user, to enable the consumer information management device to remove the attribute from a set of public attributes associated with the user in response to determining that continued publication violates a privacy criteria.

Example 11 may include the subject matter of any of Examples 9-10, and may specify that provide the data representative of the population count to the users includes provide a broadcast message containing the data representative of the population count to an administrative broadcast channel subscribed to by the users.

Example 12 may include the subject matter of any of Examples 9-11, and may further include subscription logic, operatively coupled with the notification logic, to automatically subscribe all users who have published an attribute within the computing system to the administrative broadcast channel.

Example 13 may include the subject matter of any of Examples 9-12, and may specify that the attribute includes at least one of an affinity associated with a user, demographic information about a user, or activity history of a user.

Example 14 may include the subject matter of any of Examples 9-13, and may specify that publication of an attribute within the computing system includes registration of the attribute with a publish-and-subscribe server of the computing system.

Example 15 may include the subject matter of any of Examples 9-14, and may specify that determine when the population count has decreased by a threshold amount includes determine when the population count has decreased by a threshold amount in a particular period of time, representing a rate of change of decrease.

Example 16 may include the subject matter of any of Examples 9-15, and may further include authentication logic, operatively coupled with the tracking logic, to authenticate data used in determining the population count; and security logic, operatively coupled with the notification logic, to provide a key, corresponding to the attribute, for use by the users in authenticating the data representative of the population count.

Example 17 is a method for monitoring an attribute published in a computing system, including: receiving a notification, from a dimension authority device, of a decrease in a population count of users of the computing system who have published an attribute within the computing system, wherein a user has published an attribute when the attribute is included in a set of public attributes associated with the user; determining whether the user has published the attribute; in response to receiving the notification of a decrease in the population count of users and the determination that the user has published the attribute, determining a value representative of a likelihood that continued publication of the attribute will enable identification of the user; comparing the value representative of the likelihood to a threshold; and when the value representative of the likelihood exceeds the threshold, removing the attribute from the set of public attributes.

Example 18 may include the subject matter of Example 17, and may specify that an attribute included in the set of public attributes associated with the user is available to at least one other entity of the computing system.

Example 19 may include the subject matter of any of Examples 17-18, and may specify that the at least one other entity includes a content provider, the content provider to select content for the user based on at least one of the attributes in the set of public attributes associated with the user.

Example 20 may include the subject matter of any of Examples 17-19, and may specify that removing the attribute from the set of public attributes is performed without requiring the user to authorize the removal in the period between the receipt of the notification and the removal of the attribute.

Example 21 may include the subject matter of any of Examples 17-20, and may specify that the threshold is based on a risk tolerance associated with the user.

Example 22 is a method for monitoring an attribute published in a computing system, including: tracking a population count of users of the computing system who have published an attribute within the computing system; determining when the population count has decreased by a threshold amount; and in response to the determination that the population count has decreased by the threshold amount, providing data representative of the population count to the users of the computing system.

Example 23 may include the subject matter of Example 22, and may specify that providing data representative of the population count to the users includes providing data representative of the population count to a consumer information management device that operates on behalf of a user, to enable the consumer information management device to remove the attribute from a set of public attributes associated with the user in response to determining that continued publication violates a privacy criteria.

Example 24 may include the subject matter of any of Examples 22-23, and may specify that providing the data representative of the population count to the users includes providing a broadcast message containing the data representative of the population count to an administrative broadcast channel subscribed to by the users.

Example 25 may include the subject matter of any of Examples 22-24, and may specify that publication of an attribute within the computing system includes registration of the attribute with a publish-and-subscribe server of the computing system.

Example 26 is one or more computer readable media having instructions thereon that, when executed by one or more processing devices of a computing device, cause the computing device to perform the method of any of Examples 17-25.

Example 27 is an apparatus including means for performing the method of any of Examples 17-25.

Example 28 is a system including: one or more processing devices; and one or more computer readable media having instructions thereon that, when executed by the one or more processing devices, cause the apparatus to perform the method of any of Examples 17-25.

The description herein of illustrated implementations, including what is described in the Abstract, is not intended to be exhaustive or to limit the embodiments to the precise forms disclosed. While specific implementations are described herein for illustrative purposes, various equivalent modifications are possible within the scope of the disclosure, as those skilled in the relevant art will recognize.

These modifications may be made to the example embodiments in light of the above detailed description. The terms used in the following claims should not be construed to limit the scope of the disclosure to the specific implementations disclosed in the specification and the claims.

What is claimed is:

1. A consumer information management device for a user to engage with content of a multi-user computing system with enhanced privacy protection for the user, comprising:

one or more computer processors;

notification receipt logic to operate on the one or more computer processors to receive a notification, from a dimension authority device, of a decrease in a population count of users of the multi-user computing system who have published an attribute within the multi-user computing system to a set of public attributes to engage content of the multi-user computing system, wherein the notification includes dimension data that is authenticated using one or more dimension keys comprising a private key provisioned to the one or more computer processors during manufacture and a public key corresponding to the private key, and wherein at least a subset of the dimension keys have been provided to the multi-user computing system using a sign and mac (SIGMA) exchange between the dimension authority device and the multi-user computing system within a trusted execution environment comprising enforced thread and memory access isolation and authentication of the dimension data using the dimension keys;

public profile logic, operatively coupled with the notification receipt logic, to operate on the one or more computer processors to determine that the user has published the attribute;

risk analysis logic, operatively coupled with the notification receipt logic and the public profile logic, to operate on the one or more computer processors to, in response to the receipt of a notification of a decrease in the population count of users and the determination that the user has published the attribute, determine a value representative of a likelihood that private information for the user will be identified publicly if the attribute of the user continues to be published;

user privacy logic, operatively coupled with the risk analysis logic, to operate on the one or more computer processors to determine the value representative of the likelihood to exceed a threshold related to privacy protection of the user; and profile change logic, operatively coupled with the user privacy logic and the public profile logic, to operate on the one or more computer processors to remove the attribute from the set of public attributes to block the multi-user computing system from engaging the user with content of the multi-user computing system to enhance privacy protection of the user.

2. The consumer information management device of claim 1, wherein the profile change logic is further to include the attribute in a set of private attributes associated with the user, wherein an attribute included in the set of private attributes is not available to the dimension authority device.

3. The consumer information management device of claim 1, wherein the multi-user computing system is a social media computing system.

4. The consumer information management device of claim 1, wherein an attribute included in the set of public attributes associated with the user is available to at least one other entity of the multi-user computing system.

5. The consumer information management device of claim 4, wherein the at least one other entity includes a content provider, the content provider to select content for the user based on at least one of the attributes in the set of public attributes associated with the user.

6. The consumer information management device of claim 1, wherein the profile change logic is to remove the attribute from the set of public attributes without requiring the user to authorize the removal in a period between the receipt of the notification and the removal of the attribute.

7. The consumer information management device of claim 1, wherein the threshold is based on a risk tolerance associated with the user.

8. The consumer information management device of claim 1, wherein the profile change logic is further to unsubscribe the user from a channel associated with the attribute when the value representative of the likelihood exceeds the threshold.

9. A method for monitoring an attribute published in a multi-user computing system with enhanced privacy protection for a user of the multi-user computing system, comprising:

receiving a notification, from a dimension authority device, of a decrease in a population count of users of the multi-user computing system who have published an attribute within the multi-user computing system to a set of public attributes to engage content of the multi-user computing system, and wherein the notification includes dimension data that is authenticated using one or more dimension keys comprising a private key provisioned to one or more computer processors during manufacture, and a public key corresponding to the private key, and wherein at least a subset of the dimension keys have been provided to the computing system using a sign and mac (SIGMA) exchange between the dimension authority device and the computing system within a trusted execution environment comprising enforced thread and memory access isolation and authentication of the dimension data using the dimension keys, and wherein the dimension authority device and the multi-user computing system are different devices or systems;

determining whether the user has published the attribute;

in response to receiving the notification of a decrease in the population count of users and the determination that the user has published the attribute, determining a value representative of a likelihood that private information for the user will be identified publicly if the attribute of the user continues to be published;

determining the value representative of the likelihood exceeds a threshold related to privacy protection of the user; and when the value representative of the likelihood exceeds the threshold, removing the attribute from the set of public attributes to block the multi-user computing system from engaging the user with content of the multi-user computing system to enhance privacy protection of the user.

10. The method of claim 9, wherein an attribute included in the set of public attributes associated with the user is available to at least one other entity of the multi-user computing system.

11. The method of claim 9, wherein the at least one other entity includes a content provider, the content provider to select content for the user based on at least one of the attributes in the set of public attributes associated with the user.

12. The method of claim 9, wherein removing the attribute from the set of public attributes is performed without requiring the user to authorize the removal in a period between the receipt of the notification and the removal of the attribute.

13. The method of claim 9, wherein the threshold is based on a risk tolerance associated with the user.

14. One or more non-transitory computer readable media having instructions thereon that, in response to execution by one or more processing devices of a consumer information management device for a user to engage with content of a multi-user computing system with enhanced privacy protection, cause the consumer information management device to:

receive a notification, from a dimension authority device, of a decrease in a population count of users of the multi-user computing system who have published an attribute within the multi-user computing system to a set of public attributes to engage content of the multi-user computing system, wherein the notification includes dimension data that is authenticated using one or more dimension keys comprising a private key provisioned to the one or more processing devices during manufacture, and a public key corresponding to the private key and wherein at least a subset of the dimension keys have been provided to the computing system using a sign and mac (SIGMA) exchange between the dimension authority device and the computing system within a trusted execution environment comprising enforced thread and memory access isolation and authentication of the dimension data using the dimension keys, and wherein the dimension authority device and the multi-user computing system are different devices or systems;

determine that the user has published the attribute;

in response to the receipt of the notification of the decrease in the population count of users and the determination that the user has published the attribute, determine a value representative of a likelihood that private information for the user will be identified publicly if the attribute of the user continues to be published;

determine the value representative of the likelihood has exceeded a threshold related to privacy protection of the user; and remove the attribute from the set of public attributes to block the multi-user computing system from engaging the user with content of the multi-user computing system to enhance privacy protection of the user.

15. The one or more non-transitory computer readable media of claim 14, further having instructions thereon that, in response to execution by the one or more processing devices of the consumer information management device associated with the user of the multi-user computing system, cause the consumer information management device to:

include the attribute in a set of private attributes associated with the user, wherein an attribute included in the set of private attributes is not available to the dimension authority device.

16. The one or more non-transitory computer readable media of claim 14, wherein the multi-user computing system is a social media computing system.

17. The one or more non-transitory computer readable media of claim 14, wherein an attribute included in the set of public attributes associated with the user is available to at least one other entity of the multi-user computing system.

18. The one or more non-transitory computer readable media of claim 17, wherein the at least one other entity includes a content provider, the content provider to select content for the user based on at least one of the attributes in the set of public attributes associated with the user.

19. The one or more non-transitory computer readable media of claim 14, wherein removal of the attribute from the set of public attributes does not require the user to authorize the removal in a period between the receipt of the notification and the removal of the attribute.

20. The one or more non-transitory computer readable media of claim 14, wherein the threshold is based on a risk tolerance associated with the user.

21. The one or more non-transitory computer readable media of claim 14, further having instructions thereon that, in response to execution by the one or more processing devices of the consumer information management device associated with the user of the multi-user computing system, cause the consumer information management device to:

unsubscribe the user from a channel associated with the attribute when the value representative of the likelihood exceeds the threshold.

22. The one or more non-transitory computer readable media of claim 14, wherein the notification of the decrease in the population count of users of the multi-user computing system who have published the attribute within the multi-user computing system comprises data representative of the population count.

23. The one or more non-transitory computer readable media of claim 14, wherein the notification of the decrease in the population count of users of the multi-user computing system who have published the attribute within the multi-user computing system comprises a broadcast message to an administrative broadcast channel subscribed to by the user.

24. The one or more non-transitory computer readable media of claim 14, wherein the attribute comprises at least one of an affinity associated with the user, demographic information about the user, or activity history of the user.

25. The one or more non-transitory computer readable media of claim 14, wherein determine the value representative of the likelihood that private information for the user can be identified publicly if the attribute of the user continues to be published comprises determine when the population count has decreased by a predetermined amount in a particular period of time.

* * * * *